(12) United States Patent
Tian et al.

(10) Patent No.: US 12,125,250 B2
(45) Date of Patent: Oct. 22, 2024

(54) DECODING OF PATCH TEMPORAL ALIGNMENT FOR MESH COMPRESSION

(71) Applicant: Tencent America LLC, Palo Alto, CA (US)

(72) Inventors: Jun Tian, Belle Mead, NJ (US); Xiang Zhang, Sunnyvale, CA (US); Xiaozhong Xu, State College, PA (US); Chao Huang, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 253 days.

(21) Appl. No.: 17/954,961

(22) Filed: Sep. 28, 2022

(65) Prior Publication Data
US 2023/0162404 A1    May 25, 2023

Related U.S. Application Data

(60) Provisional application No. 63/264,417, filed on Nov. 22, 2021.

(51) Int. Cl.
*G06T 9/00* (2006.01)
*G06T 15/04* (2011.01)
*G06T 17/20* (2006.01)

(52) U.S. Cl.
CPC ............ *G06T 9/001* (2013.01); *G06T 15/04* (2013.01); *G06T 17/20* (2013.01)

(58) Field of Classification Search
CPC   G06T 9/00; G06T 9/001; G06T 15/04; G06T 17/20

USPC .......................................................... 345/582
See application file for complete search history.

(56) References Cited

U.S. PATENT DOCUMENTS

| 2021/0090301 A1* | 3/2021 | Mammou | ................. G06T 7/11 |
| 2021/0233282 A1* | 7/2021 | Kim | ...................... G06T 15/205 |
| 2021/0287430 A1* | 9/2021 | Li | ........................ G06V 10/776 |

OTHER PUBLICATIONS

Draft CfP for Dynamic Mesh Coding, International Organization for Standardization Organisation Internationale De Normalisation ISO/IEC JTC 1/SC 29/WG 7 MPEG 3D Graphics Coding ISO/IEC JTC 1/SC 29/WG 7, N00122 Apr. 2021, Virtual, Jul. 9, 2021, pp. 1-21.

* cited by examiner

*Primary Examiner* — Jacinta M Crawford
(74) *Attorney, Agent, or Firm* — ArentFox Schiff LLP

(57) ABSTRACT

Processing circuitry decodes a texture map in 2D from a bitstream carrying a 3D mesh frame. The 3D mesh frame represents a surface of an object with polygons and is partitioned into patches. The texture map includes transformed patches with transformed UV coordinates that are transformed from original UV coordinates of the patches according to remap transform parameters. The processing circuitry decodes the remap transform parameters associated with the patches and generates a recovered texture map from the texture map according to the remap transform parameters. At least a first recovered pixel in the recovered texture map is assigned with a texture value at a first transformed position in the texture map, the first transformed position in the texture map is determined according to a pixel position of the first recovered pixel and first remap transform parameters associated with a first patch that the first recovered pixel belongs to.

20 Claims, 16 Drawing Sheets

DECODING OF PATCH TEMPORAL ALIGNMENT FOR MESH COMPRESSION

INCORPORATION BY REFERENCE

This present application claims the benefit of priority to U.S. Provisional Application No. 63/264,417, "Decoding of Patch Temporal Alignment for Mesh Compression" filed on Nov. 22, 2021. The entire disclosure of the prior application is hereby incorporated by reference in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (encoding and/or decoding). In some examples, an apparatus for coding mesh includes processing circuitry. The processing circuitry decodes a texture map in two dimension (2D) from a bitstream carrying a three dimensional (3D) mesh frame. The 3D mesh frame represents a surface of an object with polygons and is partitioned into patches. The texture map includes transformed patches with transformed UV coordinates that are transformed from original UV coordinates of the patches according to remap transform parameters. The remap transform parameters indicate transformation operations that have been performed to generate the transformed patches. The processing circuitry decodes the remap transform parameters associated with the patches from the bitstream and generates a recovered texture map from the texture map according to the remap transform parameters. At least a first recovered pixel in the recovered texture map is assigned with a texture value at a first transformed position in the texture map, the first transformed position in the texture map is determined according to a pixel position of the first recovered pixel and first remap transform parameters associated with a first patch that the first recovered pixel belongs to. The processing circuitry then reconstructs the 3D mesh frame according to the recovered texture map.

In some embodiments, to generate the recovered texture map, the processing circuitry determines that the first recovered pixel belongs to the first patch according to an index map that maps the pixel position of the first recovered pixel to a first patch index indicating the first patch.

In some embodiments, to generate the recovered texture map, the processing circuitry identifies first pixel positions corresponding to boundary vertices of the first patch and determines first transformed positions in the texture map respectively corresponding to the first pixel positions by applying the first remap transform parameters on the first pixel positions. The processing circuitry assigns first texture values at the first transformed positions of the texture map to the corresponding first pixel positions in the recovered texture map.

In some examples, the processing circuitry identifies second pixel positions that are patch interior of the first patch according to the first pixel positions and determines second transformed positions in the texture map corresponding to the second pixel positions by applying the first remap transform parameters on the second pixel positions. The processing circuitry assigns second texture values at the second transformed positions of the texture map to the corresponding second pixel positions in the recovered texture map.

In some examples, the processing circuitry determines the texture value at the first transformed position in the texture map by an interpolation in response to one or more coordinates of the first transformed position not being integer.

In some examples, the first remap transform parameters includes a rotation angle, a spatial translation vector, and a reflection flag indicative of a reflection operation. The first remap transform parameters includes a rotation angle and a spatial translation vector, and a sign of the rotation angle indicates a reflection operation.

In some examples, the processing circuitry assigning a value to an unoccupied pixel in the recovered texture map according to one or more occupied pixels in an occupied area in the recovered texture map, the occupied area includes occupied pixels belonging to the patches, the unoccupied pixel is outside of the occupied area. In an example, the processing circuitry calculates the value as at least one of a mean value and/or a median value of the occupied pixels in the occupied area. In another example, the processing circuitry determines a boundary pixel in the recovered texture map, the boundary pixel is an occupied pixel having at least an unassigned neighboring pixel in a first neighborhood of the boundary pixel, the unassigned neighboring pixel has an unassigned texture value. The processing circuitry determines assigned neighboring pixels in a second neighborhood of the unassigned neighboring pixel, and determines a derived texture value to assign to the unassigned neighboring pixel based on the assigned neighboring pixels in the second neighborhood.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
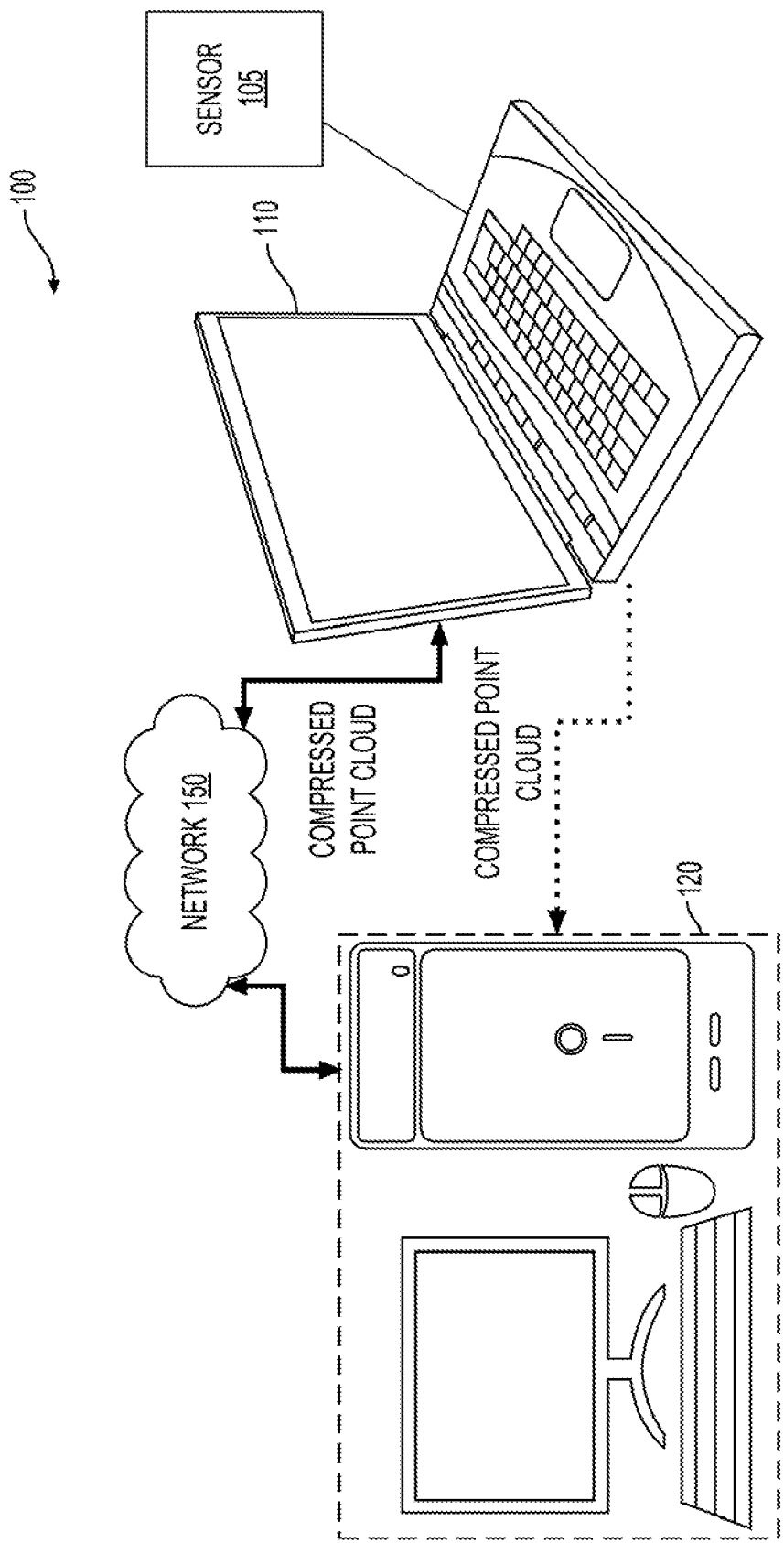
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120).

The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
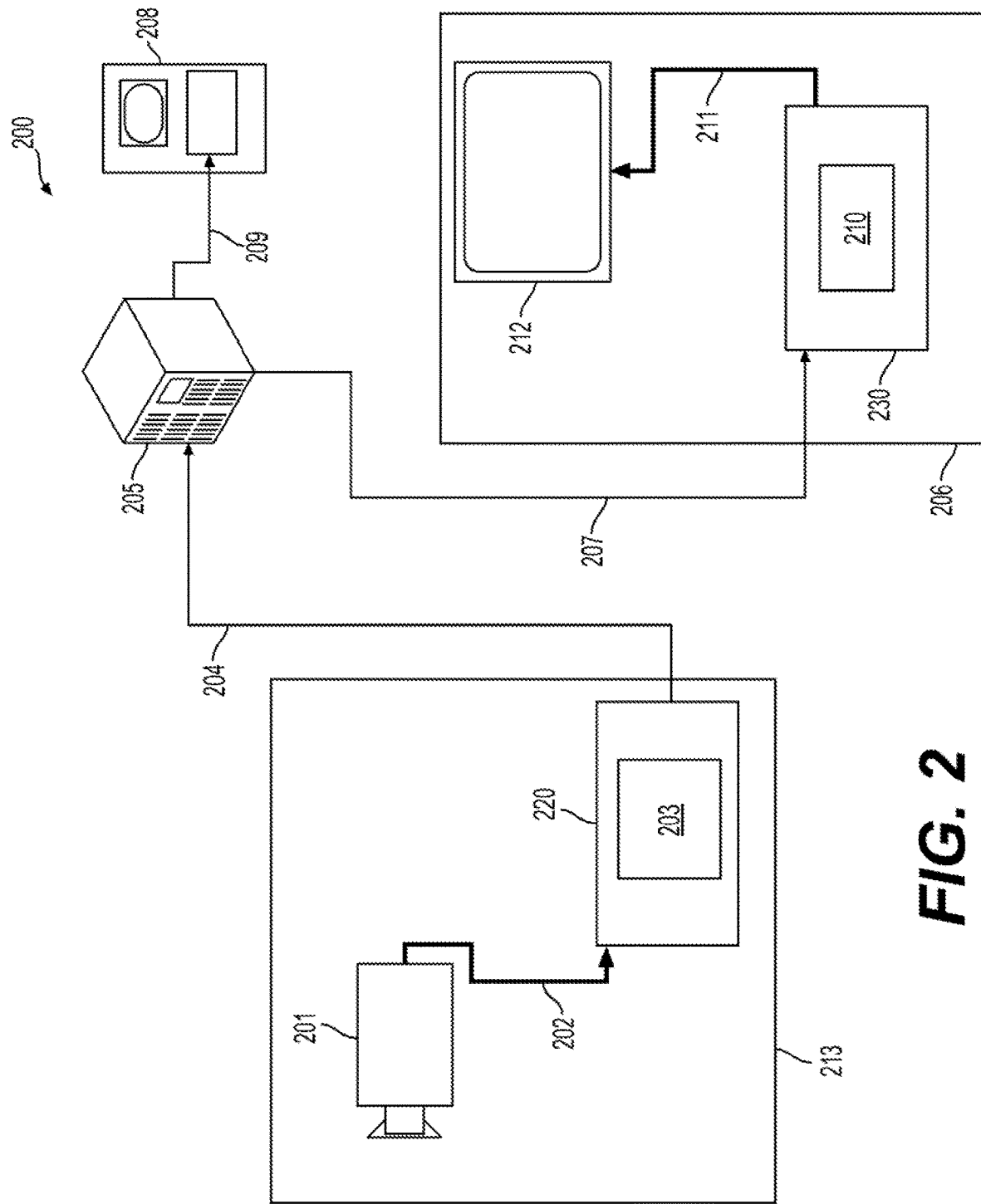
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
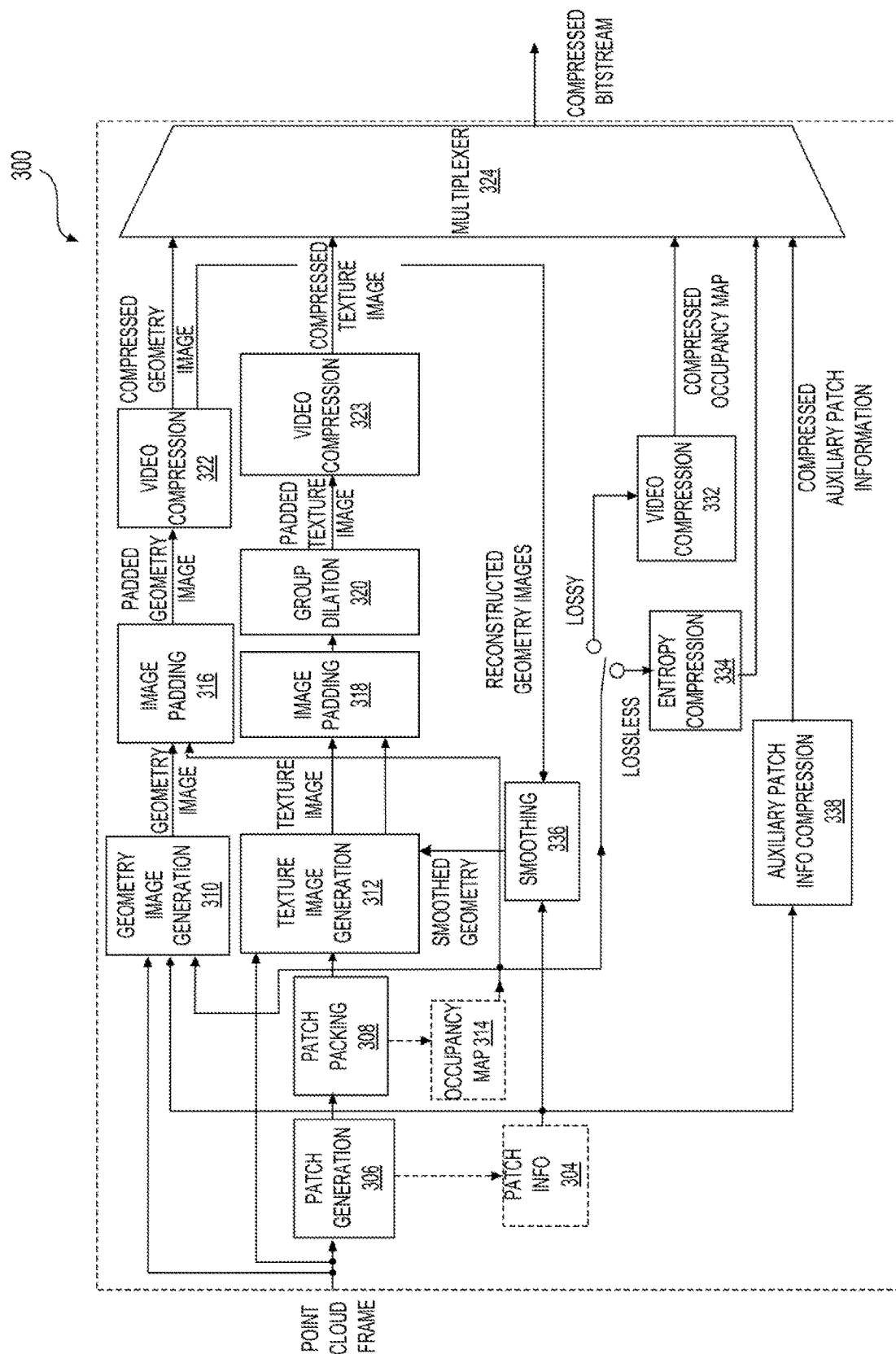
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
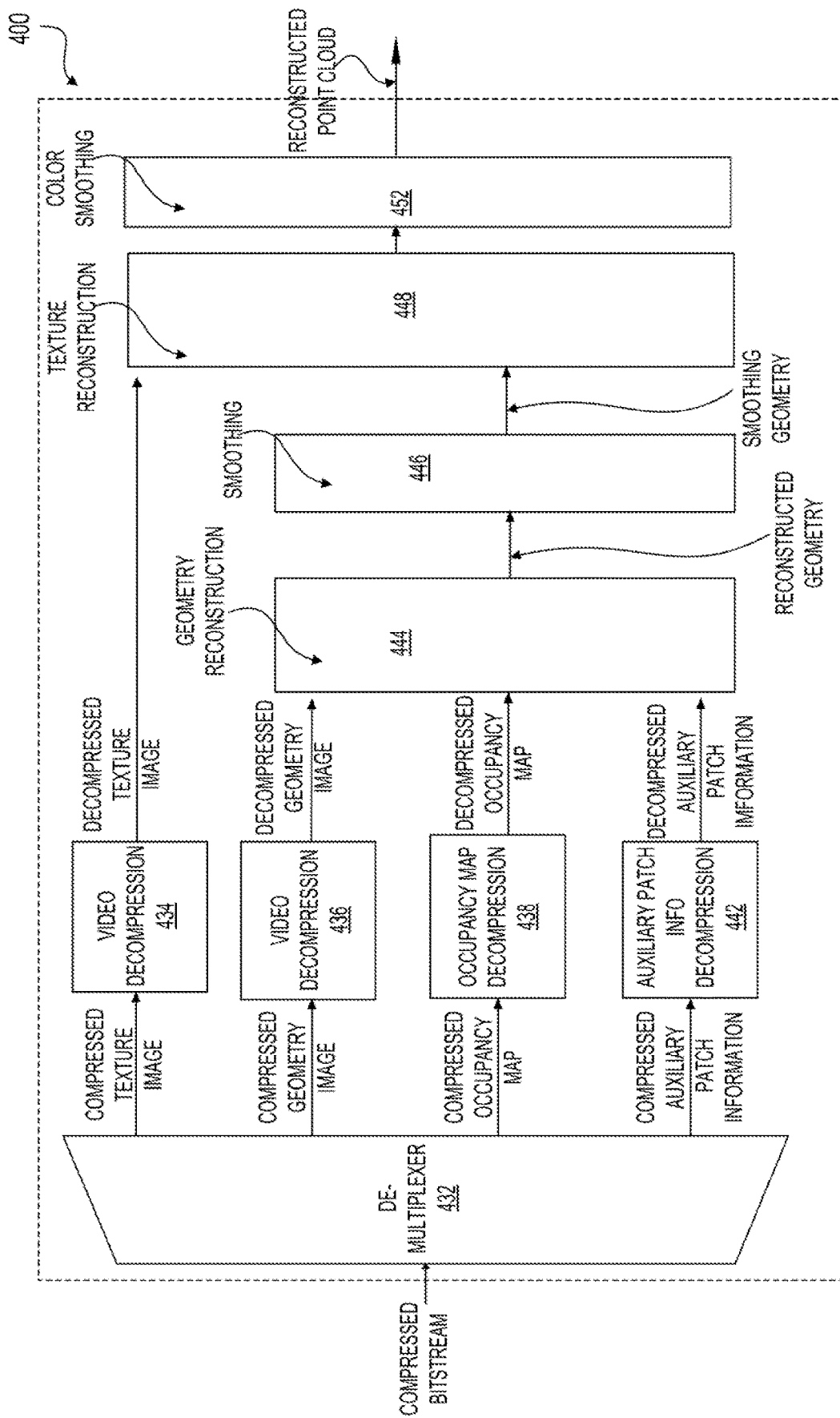
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
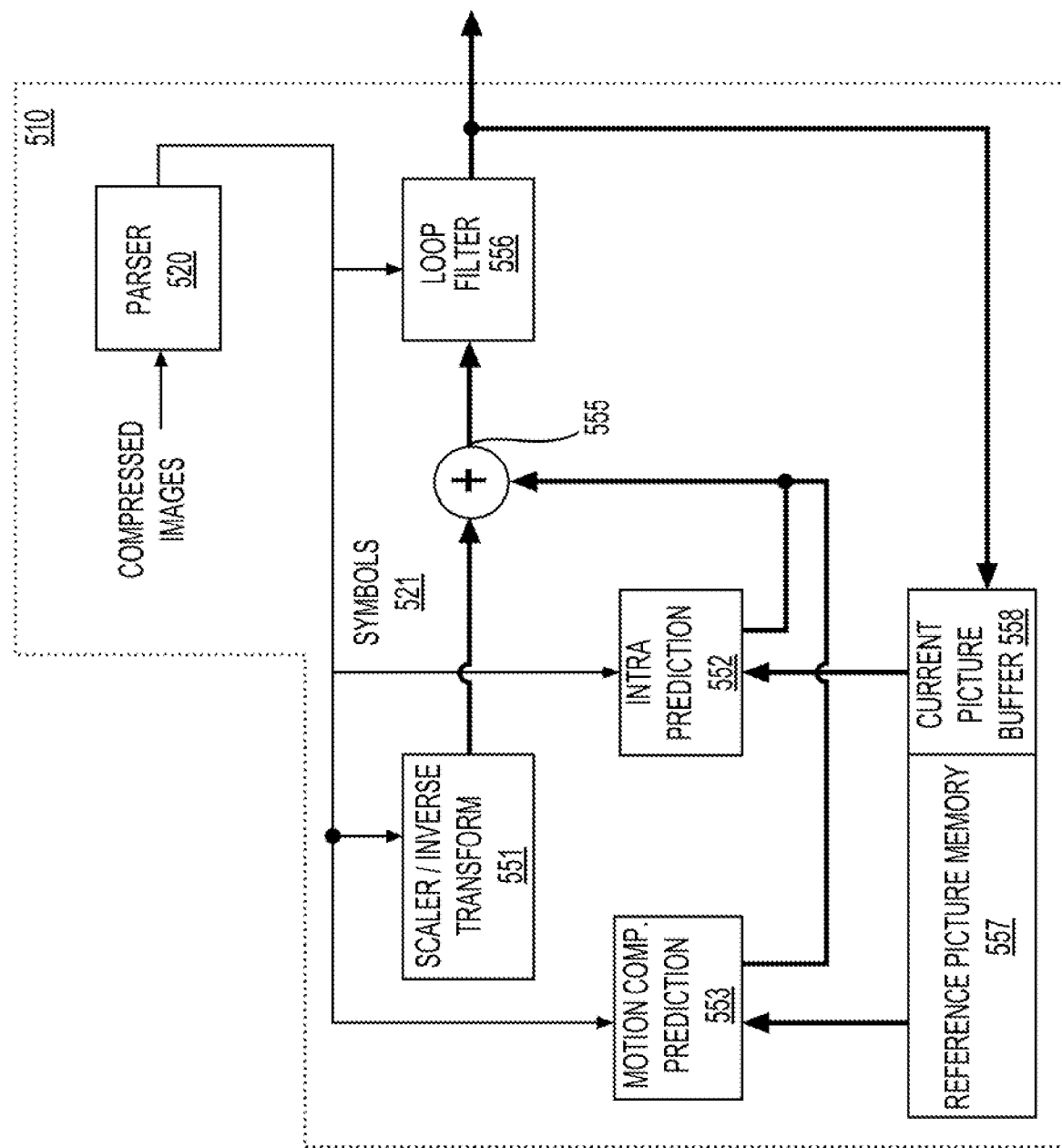
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
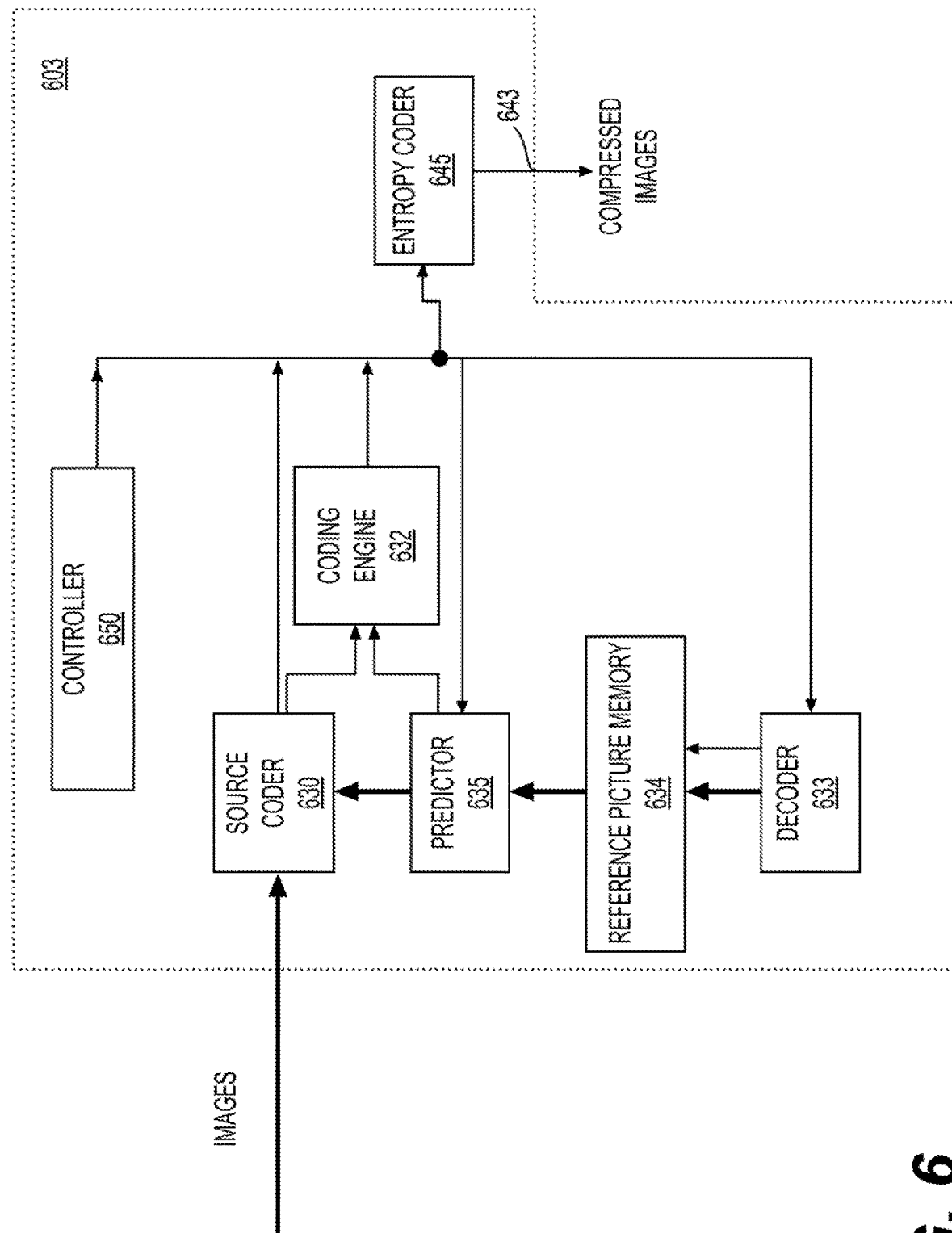
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
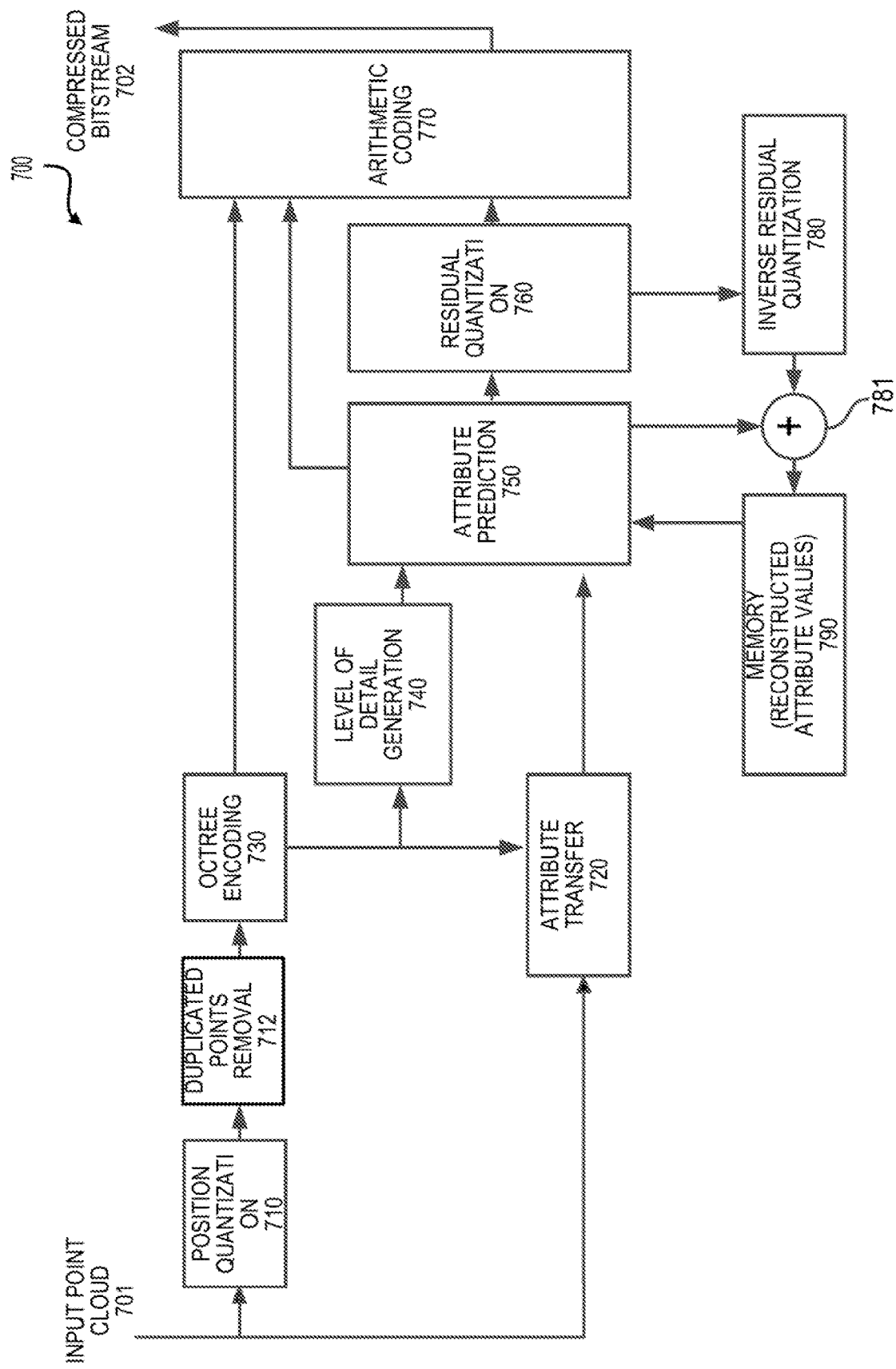
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
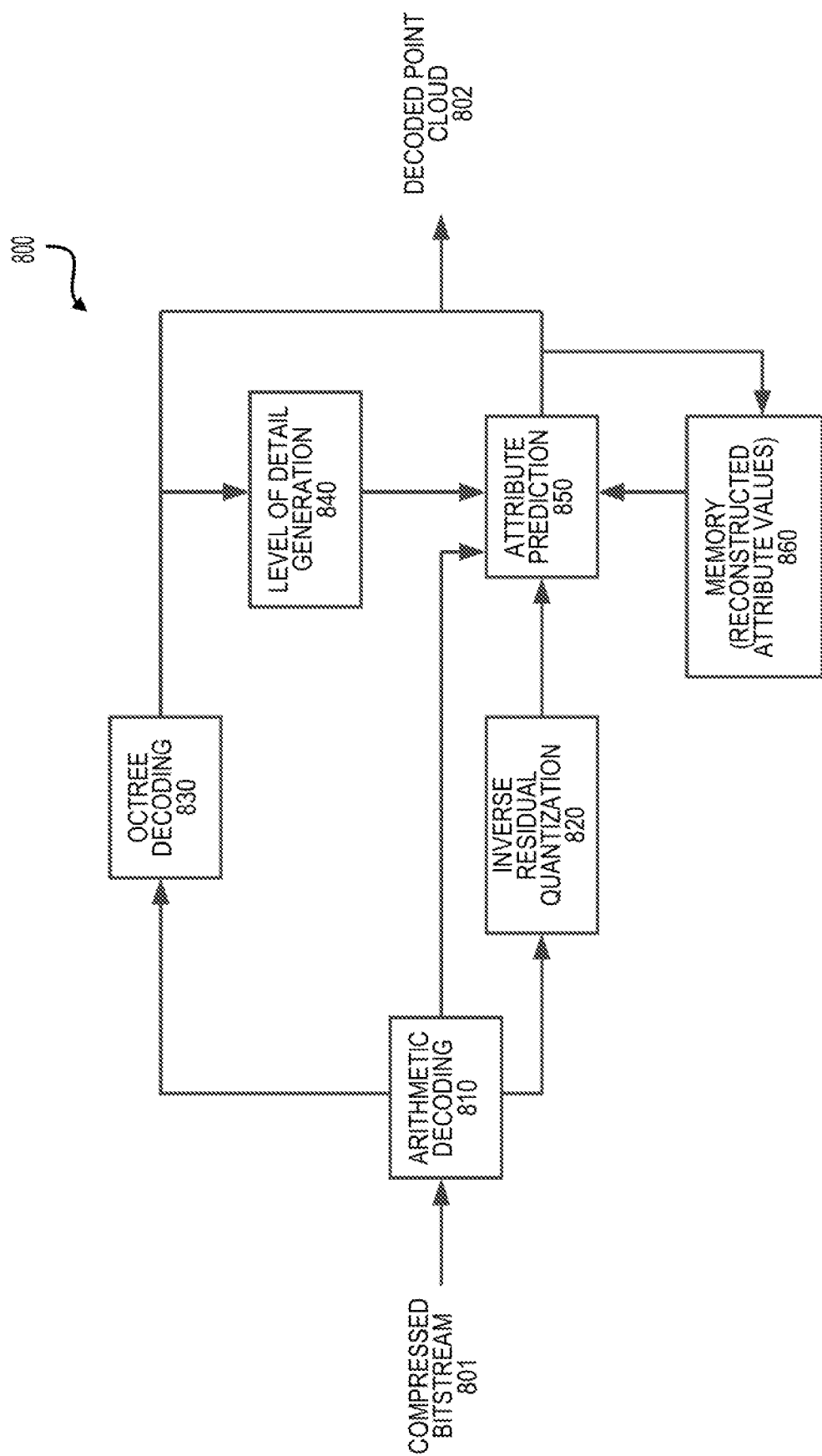
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples. A boundary loop includes a sequence of boundary vertices, boundary edges formed by the sequence of boundary vertices can form a loop that is referred to as a boundary loop.

According to an aspect of the disclosure, the patches are parameterized respectively into 2D shapes (also referred to as UV patches) in some examples. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates or UV coordinates.

According to some aspects of the disclosure, mesh compression can be performed by representing a mesh using one or more 2D maps (also referred to as 2D atlas in some examples), and then encoding the 2D maps using image or video codecs. Different techniques can be used to generate the 2D maps.

Figure 9:
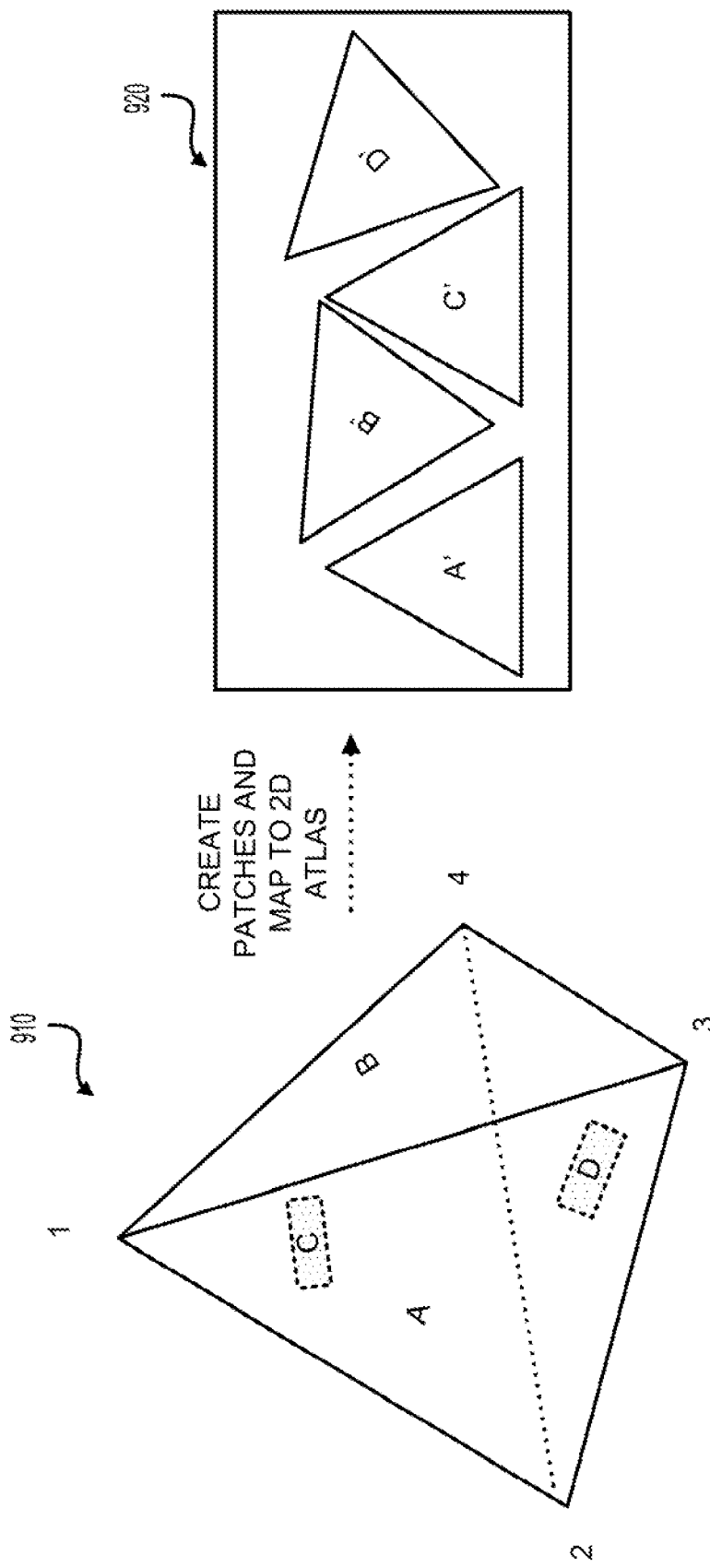
FIG. 9 shows a diagram illustrating a mapping of a mesh to an atlas in some examples.

FIG. 9 shows a diagram illustrating a mapping of a 3D mesh (910) to a 2D atlas (920) in some examples. In FIG. 9 example, the 3D mesh (910) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by the vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (920) that is also referred to as UV atlas (920) or map (920). For example, the patch A is mapped to a 2D shape (also referred to as UV patch) A' in the map (920), the patch B is mapped to a 2D shape (also referred to as UV patch) B' in the map (920), the patch C is mapped to a 2D shape (also referred to as UV patch) C' in the map (920), and the patch D is mapped to a 2D shape (also referred to as UV patch) D' in the map (920). In some examples, the coordinates in 3D domain are referred to as (x, y, z) coordinates, the coordinates in 2D domain, such as the map (920), are referred to as UV coordinates. A vertex in the 3D mesh can have corresponding UV coordinates in the map (920).

The map (920) can be geometry map with geometry information, or can be texture map with color, normal, textile, or other attribute information, or can be occupancy map with occupancy information.

While each patch is represented by a triangle in the FIG. 9 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a 2D geometry map. For example, the 2D geometry map stores the (x, y, z) coordinates of sampling points at a corresponding point in the 2D geometry map. For example, a point in the 2D geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 9, the areas that are outside the 2D shapes A', B', C' and D' are undefined. The sample values of the areas that are outside the 2D shapes A', B', C' and D' after decoding can be discarded. In some cases, an occupancy map is used to store some extra information for each pixel, such as storing a binary value to identify if a pixel belongs to a patch or is undefined.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). In some examples, mesh frames in a dynamic mesh can be representations of a surface of an object at different time, and each mesh frame is a representation of the surface of the object at a specific time (also referred to as a time instance). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

According to an aspect of the disclosure, the texture mapping (e.g., texture maps, attribute maps) consumes a large portion of mesh representation, and an efficient compression of texture mapping can be one of the crucial tasks in mesh compression. In some examples, a texture mapping at a time instance includes an image (e.g., a texture map, an attribute map) consists of 2D shapes corresponding to patches, the 2D shapes also referred to as UV patches. Each UV patch represents the texture information (such as color values in red, green, and blue) of a surface region of the mesh at the time instance. The pixel coordinates of the image correspond to UV coordinates.

Figure 10:
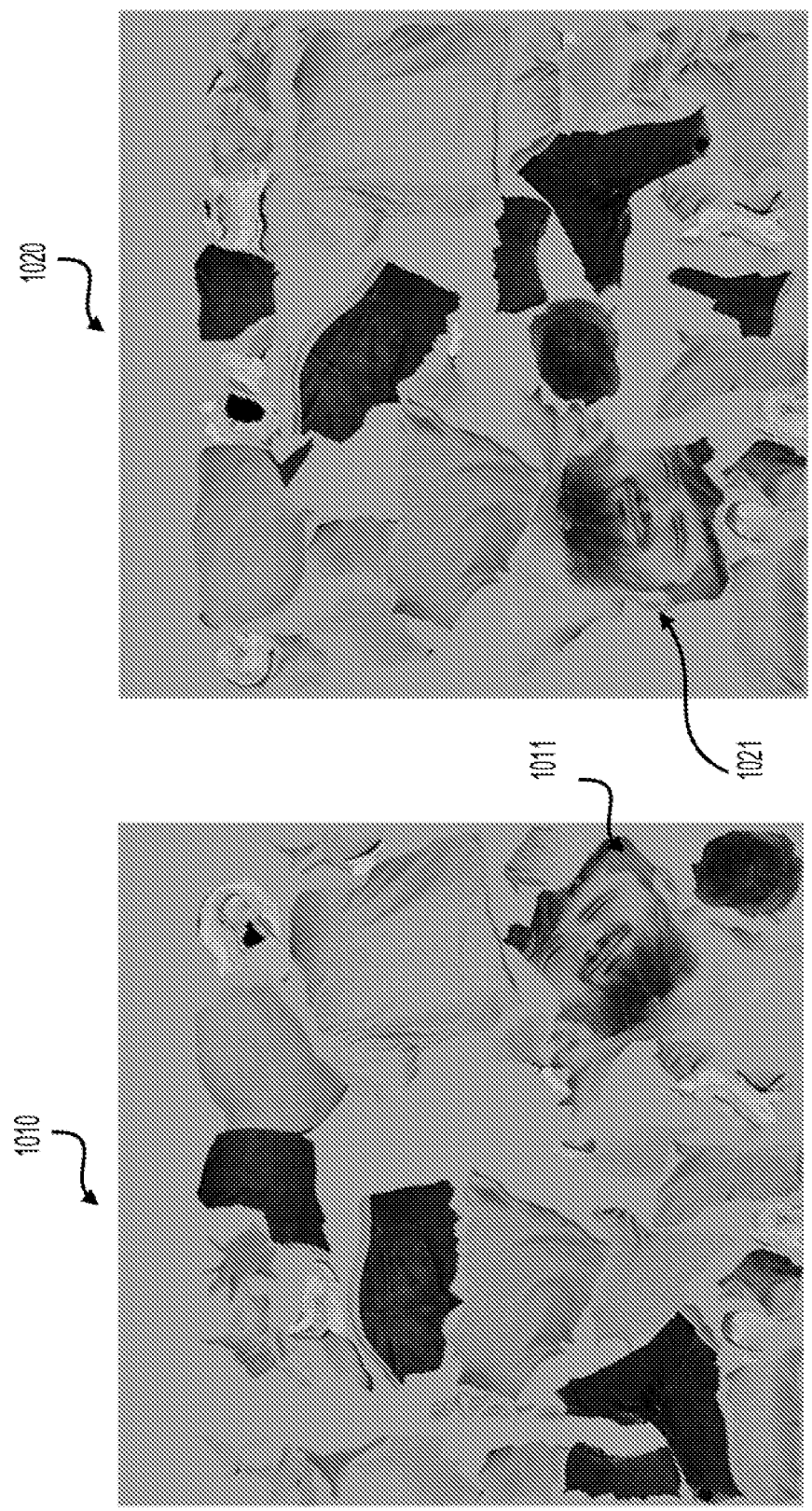
FIG. 10 shows texture maps at two time instances in an example.

FIG. 10 shows texture maps at two time instances in an example. In some examples, the texture mapping at the different time instances may be generated independently, related UV patches in the texture maps of the different time instances can be disposed differently. FIG. 10 shows a first texture map (1010) of at a first time to, and a second texture map (1020) at a second time $t_1$. Related UV patches in the first texture map (1010) and the second texture map (1020) are disposed differently. For example, the first texture map (1010) includes a UV patch (1011) corresponding to a face of a person at the first time to and the second texture map (1020) includes a UV patch (1021) corresponding to the face of the person at the second time $t_1$. The UV patch (1011) and the UV patch (1021) are related. As seen in FIG. 10, the UV patch (1011) and the UV patch (1021) are disposed in the respective texture maps by different orientation and different UV locations.

Some aspects of the disclosure provide encoding techniques for temporally aligning patches, for example temporally aligning UV patches in 2D maps, such as texture maps, attribute maps, geometry maps. For example, when UV patches in the 2D maps are temporally aligned, the 2D maps can be compressed more efficiently, for example using inter prediction techniques. It is noted that, in some examples, a mesh can be represented using 2D maps, and the term "patch" in the disclosure may refer to UV patch in the context of 2D maps.

Figure 11:
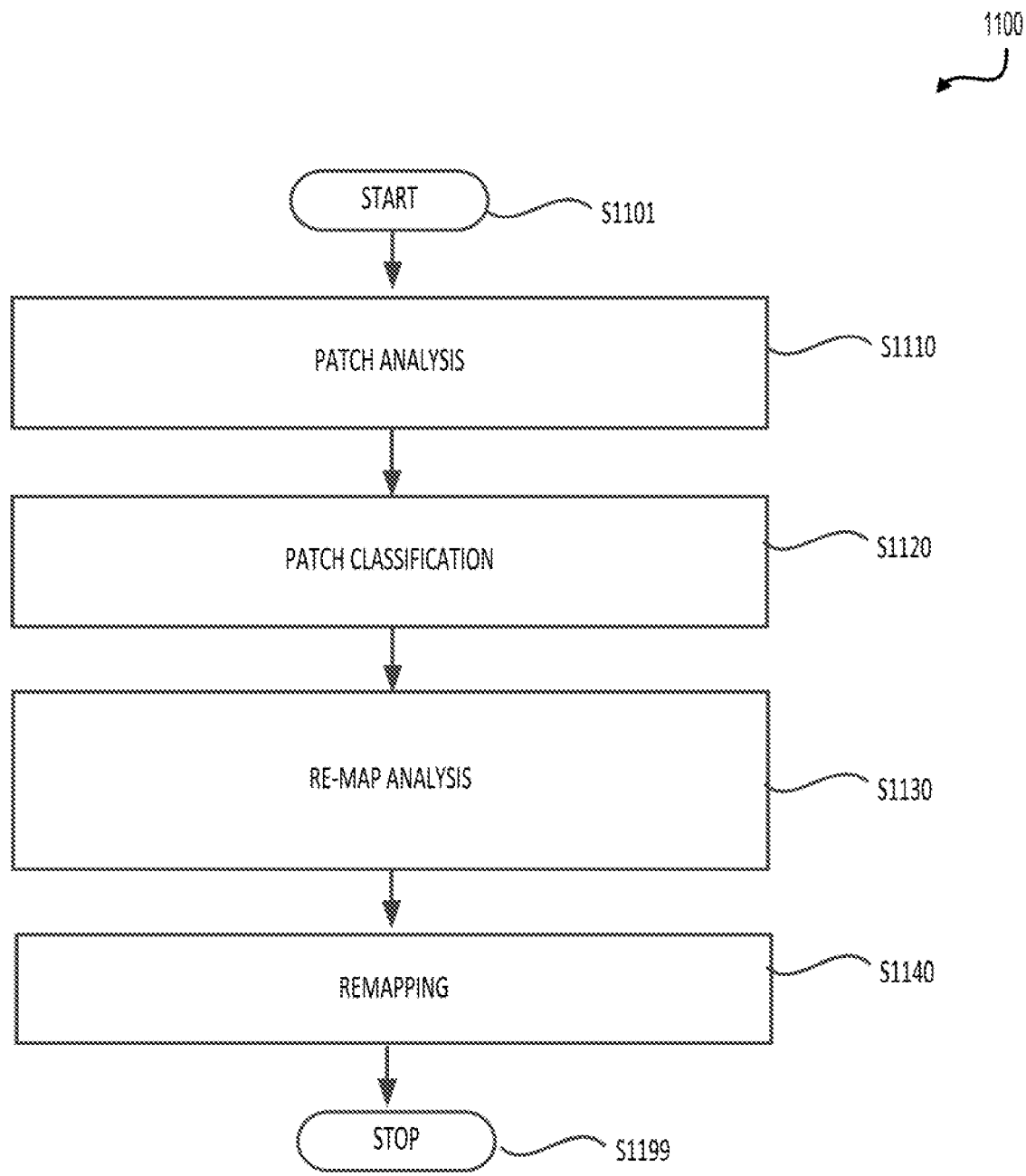
FIG. 11 shows a flow chart outlining a process example in some examples.

FIG. 11 shows a diagram of a process (1100) of patch temporal alignment according to some embodiments of the disclosure. The process (1100) can be used during an encoding process for a mesh. In various embodiments, the process (1100) is executed by processing circuitry. In some embodiments, the process (1100) is implemented in software instructions, thus when the processing circuitry executes the software instructions, the processing circuitry performs the process (1100). The process starts at (S1101) and includes (S1110) of patch analysis, (S1120) of patch classification, (S1130) of re-map analysis, and (S1140) of re-mapping.

At (S1110), patch analysis is performed. Patch analysis can analyze characteristics of patches. In some examples, during patch analysis, feature points of respective patches in 2D maps (e.g., the attribute maps, texture maps and the like) are identified. The feature points can be identified by any suitable technique, such as scale-invariant feature transform (SIFT), speedup robust features (SURF), gradient location and orientation histogram (GLOH), histogram of oriented gradients (HOG), and the like.

In some examples, during patch analysis, metrics of each patch are computed. The metrics can be scale-invariant metrics, rotation-invariant metrics, translation-invariant metrics, or affine transform invariant metrics, and the like. Several metric examples will be described in the following description. In some examples, the metric examples can be used separately as metrics in patch analysis. In some examples, two or more metrics of the metric examples can be combined to form a combined metric in the patch analysis. In some examples, other suitable metrics indicating similar characteristics of patches can be used in the patch analysis.

In some examples, a center of 3D coordinates of a patch can be computed as a metric of the patch. For example, the center of the 3D coordinates of a patch can be calculated by a weighted sum of a subset of the 3D coordinates of points (e.g., vertices) inside the patch. In an example, the center of the 3D coordinates of a patch can be computed by averaging 3D coordinates of all points (e.g., vertices) inside the patch, including the boundary points (e.g., including boundary vertices). In another example, the center of the 3D coordinates of a patch is calculated by averaging 3D coordinates of all points (e.g., vertices) inside the patch, excluding the boundary points (e.g., excluding boundary vertices). In another example, the center of the 3D coordinates of a patch is calculated as an average of 3D coordinates of all boundary vertices of the patch.

In some examples, a center of UV coordinates of a patch can be computed as a metric of the patch. For example, the center of the UV coordinates of a patch can be calculated by a weighted sum of a subset of the UV coordinates of the points (e.g., vertices) inside the patch. In an example, the center of the UV coordinates of a patch can be computed by averaging UV coordinates of all points (e.g., vertices) inside the patch, including the boundary points (e.g., boundary vertices). In another example, the center of the UV coordinates of a patch is computed by averaging UV coordinates of all points (e.g., vertices) inside the patch, excluding the boundary points (e.g., boundary vertices). In another example, the center of the UV coordinates of a patch is computed by taking the average of UV coordinates of all boundary vertices of the patch.

In some examples, a weighted average texture or attribute value of a subset of points in a patch can be computed as a metric of the patch. In an example, the weighted average texture or attribute value can be computed by averaging texture or attribute values (such as red, green, and blue channel values) of all points (e.g., vertices) inside the patch, including the boundary points (e.g., boundary vertices). In another example, the weighted average texture or attribute value is calculated by averaging texture or attribute values (such as red, green, and blue channel values) of all points (e.g., vertices) inside the patch, excluding the boundary points (e.g., boundary vertices). In another example, the weighted average texture or attribute value is calculated by taking the average of texture or attribute values (such as red, green, and blue channel values) of all boundary vertices of the patch.

At (1120), patch classification is performed. In some examples, during patch classification, patches at a given time instance can be classified into different categories based on their inter-frame consistency or any other temporal/spatial characteristics.

In some embodiments, patches of a 2D map (e.g., the geometry map, the texture map or attribute map) at a given time instance can be classified into two classes that are referred to as Class M and Class N. Class M includes patches that a reference matching patch is found at a past time instance, and Class N includes patches that no reference matching patch is found at the past time instance. In some examples, a patch and a reference matching patch for the patch can be representations of a portion of a surface of an object at different time instances. For example, the patch represents a specific surface portion of an object at a current time, and the reference matching patch represents the specific surface portion of the object at a past time instance.

During patch classification, in some examples, for each patch, a reference match technique is employed on a 2D map (e.g., a geometry map, a texture map or a attribute map) at a past time instance, to determine whether a reference matching patch is found at the past time instance.

In some examples, a technique can determine, for a patch at a given time instance, a reference matching patch in a past time instance based on feature matching, for example when the patch and the reference matching patch have enough matched feature points. In an embodiment, a cross feature matching technique can be utilized. For example, based on extracted feature points, a patch denoted by $P_{i,t}$ at the given time instance (t) is matched against all patches at a past time instance (t-k). Among all the patches at the past time instance (t-k), a best matching patch (e.g., based on the number of matched feature points) for the patch $P_{i,t}$ is denoted by $P_{i0,t-k}$. Then, the patch $P_{i0,t-k}$ at the past time instance (t-k) is matched against all patches at the time instance (t) to find the best future matching patch. When the best future matching patch for $P_{i0,t-k}$ is $P_{i,t}$, $P_{i0,t-k}$ and $P_{i,t}$ are cross-match according to the cross feature matching technique. Then, for patch $P_{i,t}$, a reference matching patch exists at the past time instance, and $P_{i,t}$ is classified into Class M. Otherwise (e.g., the best future matching patch for $P_{i0,t-k}$ is not $P_{i,t}$), $P_{i,t}$ is classified into Class N.

In some examples, during patch classification, a metric matching technique is employed on a 2D map (e.g., a geometry map, a texture map or an attribute map) at a past time instance, to determine whether a reference matching patch is found at the past time instance. In an example, using the center of 3D coordinates, a patch $P_{i,t}$ at the time instance (t) is matched against all patches at a past time instance (t-k), where k is a positive number. Among all the patches at the past time instance (t-k), a patch (denoted by $P_{i0,t-k}$) with the smallest difference in the center of 3D coordinates to the patch $P_{i,t}$ can be selected as the best matching patch. The difference in the center of 3D coordinates can be measured by $1^1$ norm, $1^2$ norm, or any other distance measure. Then, the best matching patch $P_{i0,t-k}$ is matched against all patches at the time instance (t) using the center of 3D coordinates to find the best future matching patch for $P_{i0,t-k}$. If the patch $P_{i0,t-k}$ has the smallest difference in the center of 3D coordinates to the patch $P_{i,t}$ among patches at the past time instance (t-k), and in addition, the patch $P_{i,t}$ has the smallest difference in the center of 3D coordinates to the patch $P_{i0,t-k}$ among the patches at the time instance (t) (e.g., the patch $P_{i,t}$ is the best future matching for $P_{i0,t-k}$), then $P_{i0,t-k}$ and $P_{i,t}$ are cross-match according to cross matching of the center of 3D coordinates, $P_{i,t}$ is classified into Class M. Otherwise (e.g., the best future matching patch for $P_{i0,t-k}$ is not $P_{i,t}$), $P_{i,t}$ is classified into Class N.

In some examples, more than one metrics can be used in the metric matching technique. In an example, for a patch $P_{i,t}$ at the time instance (t), a cross match patch $P_{i0,t-k}$ at the past time instance is found according to the center of 3D coordinates, and the difference of another metric (e.g., the average texture value) or two metrics (e.g., the average texture value, and the center of UV coordinates) of the two cross match patches is small, such as less than a given threshold (or two given thresholds in the case of two metrics), $P_{i,t}$ is classified into Class M. Otherwise (e.g., the difference of the other metric(s) is equal or greater than the threshold), $P_{i,t}$ is classified into Class N.

In some examples, Hausdorff distance is used in the metric matching. For example, a patch $P_{i,t}$ at the time instance t is matching against all patches at the past time instance (t-k), where k is a positive number according to Hausdorff distance of 3D coordinates.

In some examples, Hausdorff distance is combined with one, two, or more of the computed metrics (such as the average texture value, and/or the center of 3D coordinates, and/or the center of UV coordinates, etc.) in the metric matching.

It is noted that while the patch classification in the above description performs reference matching of a given time instance to a past time instance, the patch classification can be also applied using reference matching of a given time instance to a future time instance. For example, patches of a 2D map (e.g., geometry map, texture map or attribute map) at a given time instance are classified into two classes that are referred to as Class M and Class N. Class M includes patches that a reference matching patch is found at a future time instance; and Class N includes patches that no reference matching patch is found at a future time instance.

At (S1130), re-map analysis is performed. In some examples, during the re-map analysis, re-map transform parameters, such as a rotation parameter, a reflection parameter, a translation parameter, and the like are calculated for each patch to make the patches aligned better in temporal domain.

In some examples, the re-map transform parameters can be derived based on matching local feature points.

In some examples, the re-map analysis starts with patches in the Class M. After the re-map analysis is completed with the patches in Class M, the re-map analysis can be performed on patches in the Class N.

In an embodiment, for re-map analysis, a packed patch list L is initialized to be empty. Then, patches in the Class M are ordered by size. Re-map analysis is performed on the patches in the Class M following the size order. For example, a large patch in the Class M is analyzed before a small patch in the Class M. In an example, the patch size can be computed by the number of pixels inside the patch, including the boundary. In another example, the patch size can be computed by the number of pixels inside the patch, excluding the boundary. In another example, the patch size can be the area of the smallest rectangular bounding box containing the patch.

In some examples, a rotation angle is determined during the re-map analysis for each patch to achieve highest similarity to the reference matching patch. In some examples, a patch $P_{i,t}$ in Class M has a reference matching patch at the time instance (t-k), k is a positive number, the reference matching patch is denoted by patch $P_{i0,t-k}$. In an example, for the patch $P_{i,t}$, a rotation angle $r_{i,t}$ is determined, such that a rotated patch denoted by $R(P_{i,t})$, which is after a rotation of patch $P_{i,t}$ with the angle $r_{i,t}$, has the highest similarity (the similarity value is referred to as a first highest similarity value) to the reference $P_{i0,t-k}$. In some examples, the rotation angle $r_{i,t}$ is a value between 0 and $2\pi$, $0<=r_{i,t}<2\pi$. In some examples, the similarity can be measured by the intersection over union (IoU) value. In some examples, the similarity measure is the cross-correlation between the rotated patch $R(P_{i,t})$ and the reference matching patch $P_{i0,t-k}$.

In some examples, the patch $P_{i,t}$ is reflected along the horizontal axis to generate a reflected patch $FP_{i,t}$, and a rotation angle $f_{i,t}$ is determined for the reflected patch $FP_{i,t}$ to have the highest similarity (the value of the similarity is referred to as a second highest similarity value) to the reference $P_{i0,t-k}$. Then, the similarity values of the first highest similarity value and the second highest similarity value can be compared to determine whether to use $r_{i,t}$ on the patch $P_{i,t}$ or use $f_{i,t}$ on the reflected patch $FP_{i,t}$. In an example, when the first similarity value is higher, the final rotation angle is $r_{i,t}$; when the second similarity value is higher, the final rotation angle $r_{i,t}$ can be set to be $-f_{i,t}$. It is noted that the range of the final rotation angle $r_{i,t}$ is $-2\pi < r_{i,t} < 2\pi$, where a negative angle indicates a reflection is applied to the patch $P_{i,t}$.

In some examples, a one-bit reflection flag is used to indicate whether or not a reflection is applied. With the one-bit reflection flag, the rotation angle is in the range of 0 and $2\pi$.

In some examples, after the rotation angle $r_{i,t}$ is determined, a spatial translation value $(u_{i,t}, v_{i,t})$ for the rotated patch $R(P_{i,t})$ is determined. In an example, the spatial translation value $(u_{i,t}, v_{i,t})$ is initially set at an initialization value such that the center of UV coordinates of patch $R(P_{i,t})$ after spatial translation (referred to as spatially translated patch, and denoted by $T(R(P_{i,t}))$ is equal to the center of UV coordinates of the reference matching patch $P_{i0,t-k}$. Then, the spatial translated patch $T(R(P_{i,t}))$ is checked whether the spatial translated patch $T(R(P_{i,t}))$ overlaps with any patches already in the packed patch list L. If the spatial translated patch $T(R(P_{i,t}))$ is overlapping-free with other patches in the packed patch list L, the spatial translated patch $T(R(P_{i,t}))$ is added to the packed patch list L. Then, the re-map analysis can be continued to a next patch in the Class M by the size order.

In some examples, the spatial translation value $(u_{i,t}, v_{i,t})$ is initialized by calculating the cross-correlation value between rotated patch $R(P_{i,t})$ and the reference matching patch $P_{i0,t-k}$ over a window for the spatial translation values. A value in the window that can give the highest cross-correlation value can be used as the initialization value of the spatial translation value $(u_{i,t}, v_{i,t})$.

In some examples, during overlapping check, the spatial translated patch $T(R(P_{i,t}))$ overlaps with a patch already in the packed patch list L, then the spatial translation value $(u_{i,t}, v_{i,t})$ can be gradually modified in a range centered at the initialization value, and the overlapping check can be performed on the spatial translated patch $T(R(P_{i,t}))$ with the modified spatial translation value to check whether the spatial translated patch $T(R(P_{i,t}))$ overlaps with any patches in the packed patch list L. When the spatial translated patch $T(R(P_{i,t}))$ is overlapping-free with patches in the packed patch list L, the spatial translated patch $T(R(P_{i,t}))$ is added into the packed patch list L. Then, re-map analysis can continuate to a next patch in the Class M by the size order.

However, in an example, if for all spatial translation values $(u_{i,t}, v_{i,t})$ in the search range, overlapping happens between the spatial translated patch $T(R(P_{i,t}))$ and some of the patches in the packed patch list L, the patch $P_{i,t}$ is removed from the Class M and added into the Class N. Then, re-map analysis continues to a next patch in the Class M by the size order.

After re-map analysis of all patches in Class M is completed, re-map analysis continues to patches in the Class N.

In some examples, patches in Class N are ordered by size. Re-map analysis follows the size order. For example, a large patch in the Class N is re-map analyzed before a small patch in the Class N. In an example, the patch size is computed by the number of pixels inside the patch, including the boundary. In another example, the patch size is the number of pixels inside the patch, excluding the boundary. In another example, the patch size is the area of the smallest rectangular bounding box containing the patch.

In some examples, for a patch $P_{i,t}$ in the Class N, a spatial translation value $(u_{i,t}, v_{i,t})$ can be determined. In an example, the spatial translation value $(u_{i,t}, v_{i,t})$ is initially set to (0, 0) that indicates no spatial translation. Then, the patch $P_{i,t}$ is checked whether the patch $P_{i,t}$ overlaps with any patches already in the packed patch list L. If the patch $P_{i,t}$ is overlapping-free (e.g., is not overlapping with any patch in the packed patch list L), the patch $P_{i,t}$ is added into the packed patch list L. Then, the re-map analysis continues to a next patch in the Class N by the size order.

In some examples, if the patch $P_{i,t}$ overlaps with a patch in the packed patch list L, the spatial translation value $(u_{i,t}, v_{i,t})$ is gradually modified in a range centered at (0,0), and the overlapping check is performed to check whether the spatial translated patch denoted by $T(P_{i,t})$ with the gradually modified spatial translation value overlaps with any patches in the packed patch list L. If the spatial translated patch denoted by $T(P_{i,t})$ is overlapping-free, the spatial translated patch $T(P_{i,t})$ is added into the packed patch list L. Then, re-map analysis continues to a next patch in the Class N by the size order.

In some examples, if for all spatial translation values $(u_{i,t}, v_{i,t})$ in the search range, overlapping happens between $T(P_{i,t})$ and some of the patches in the packed patch list L, the re-map analysis stops (referred to as an early stop). The early stop indicates that the re-map will not be feasible with the given search range. In an example, the re-mapping stage (S1140) will be skipped. As a result, the re-mapping at the given time instance (t) will not be performed.

In some examples, when the re-map analysis with patches in Class N is complete without early stop, re-mapping (S1140) can be performed.

At (S1140), re-mapping is performed.

In some examples, during re-mapping, one or more new 2D maps, such as a new texture map or a new attribute map is generated for the time instance (t). In an example, each pixel in an original 2D map (e.g., an original texture map or an original attribute map) can be checked to determine whether the pixel belongs to a patch.

If the pixel belongs to a patch $P_{i,t}$, the pixel is an occupied pixel. For the occupied pixel of the patch $P_{i,t}$, a new location in the new 2D map (e.g., new geometry map, new texture map or new attribute map) can be determined by applying the rotation angle and spatial translation value for the patch $P_{i,t}$ on the pixel location. It is noted that in some examples, the patch $P_{i,t}$ is in the Class N, then re-map transform parameters of the patch $P_{i,t}$ may not include the rotation angle parameter, then no rotation will be applied to the pixel. After deriving the new location of the pixel, the pixel value in the original 2D map (e.g., geometry map, texture map or attribute value) is assigned to be the value at the new location in the new 2D map. Then re-mapping continues to a next pixel.

If the pixel does not belong to any patch, the pixel is an un-occupied pixel in the original 2D map (e.g., geometry map, texture map or attribute map), then the re-mapping continues to a next pixel.

After pixels values of all occupied pixels in the original 2D map have been re-mapped to the new 2D map, there may be pixels in the new map that have not been assigned with values. These are the unoccupied pixels in the new 2D map.

For unoccupied pixels in the new 2D map (e.g., new geometry map, new texture map or new attribute map), any suitable values can be assigned. In an example, to improve the coding efficiency, the unoccupied pixels can be derived from values of occupied spatial/temporal neighbors. In another example, unoccupied pixels can be assigned with a constant value, where the constant value can be a mean value or median value of all occupied pixels. In another example, a boundary expansion technique is used, the boundaries of patches are expanded to fill the boundary values into unoccupied pixels. In another example, a mip-map technique is used to fill unoccupied pixels.

In some embodiments, for each 2D map, such as geometry map, texture map, attribute image, and the like, the patch temporal alignment is applied to generate a new 2D map, such as new geometry map, new texture map, new attribute map, and the like. However, in the case of an early stop during re-map analysis, the new 2D map can be an exact copy of the original 2D map.

In some examples, for a 2D map (e.g., the geometry map, the texture map or attribute map) at the beginning of the time of a mesh sequence, such as the very first 2D map, the corresponding new 2D map can be an exact copy of the original 2D map. In some examples, a 2D map at a future time instance is used as a reference frame, and a new 2D map can be generated for the very first 2D map in the mesh sequence.

In some examples, with new 2D maps (e.g., new geometry map, new texture map or new attribute map) are generated for every time instance to form a new 2D map sequence, compression can be applied on the new 2D map sequence.

In some examples, in order to restore 2D maps (e.g., texture map or attribute map) to original UV coordinates at the decoder side, re-map transform parameters for each patch can be communicated between the encoder and decoder, such that the decoder could restore the original 2D map.

According to an aspect of the disclosure, the re-map transform parameters can be coded by various techniques. In some examples, for each patch, a one-bit transform flag can be signaled to indicate whether the re-map transform is a non-trivial transform. A trivial transform is re-map transform with no reflection, rotation angle of zero degree, and spatial translation values of (0, 0). In some examples, the rotation angle can be quantized prior to coding. In an example, the quantization of the rotation angle can be done with a quantization step of $\pi/2$, $\pi/4$, or some other quantization step. In some examples, the spatial translation values can be quantized prior to coding. The quantization of the spatial translation values can be done with a quantization step of integer values, floating point value, or some other quantization step.

In some embodiments, the UV coordinates in the mesh representation (such as a 3D geometry representation, like the Wavefront obj file) are updated. For example, the geometry map is updated to the new geometry map. After UV coordinates updates, there is no need to encode re-map transform parameters.

According to another aspect of the disclosure, adaptive sampling may be applied at the encoder side. In some examples, the patch temporal alignment methods can be employed together with adaptive sampling methods.

In adaptive sampling, a sampling step is adaptively applied to the geometry map, texture map, or attribute map which can reduce the bandwidth needed to represent the information. After adaptive sampling, patches in a 2D map, such as the geometry map, the texture map, or the attribute map, and the like can be temporally aligned. It is noted that patches may have been sampled by different sampling rates during an adaptive sampling.

According to some aspects of the disclosure, at the encoder side, the texture mapping, such as a texture map and/or an attribute map, can have patches that are temporal aligned, but geometry information (e.g., UV coordinates of vertices, connectivity information) can be the original geometry information of the mesh. The temporally aligned texture mapping and the original geometry information are encoded into a bitstream by the encoder, and the bitstream can be provided to the decoder side. At the decoder side, the decoder can perform decoding of patch temporal alignment, and can restore the original texture map.

In some embodiments, an index map is available at the decoder. The index map can indicate for each pixel in an original texture map, whether the pixel belongs to a patch. If the pixel belongs to a patch, the index map can indicate a patch index that identifies the patch. In some examples, the index map is encoded into the bitstream at the encoder side; and at the decoder side, the decoder can decode the index map from the bitstream.

In some examples, based on the index map, the decoder can determine, for a pixel in a texture map to recover (also referred to as recovered texture map), a patch that the pixel belongs to, and use the re-map transform parameters of the patch, to set up a one to one correspondence between the UV coordinates of the pixel, and transformed UV coordinates of a transformed pixel in the decoded texture mapping (e.g., a decoded texture map and/or a decoded attribute map). Then, according to the decoded texturing mapping, and the one to one correspondence, pixels in the recovered texture map can be assigned with texture values of the transformed pixels in the decoded texture mapping.

According to an aspect of the disclosure, for a pixel that does not belongs to any patch, the texture value of the pixel can be assigned with arbitrary values. In some examples, the texture value can be derived from texture values of spatial/temporal neighbors (spatial/temporal neighboring pixels).

In some embodiments, no index map is available at the decoder. The decoder can derive an index map and generate a recovered texture map that can be the original texture mapping in some examples. In some examples, the decoder can start restoration with boundary vertices of patches. Based on the boundary vertices of patches, the decode can restore patch interior, and then determine texture values for unoccupied pixels.

According to an aspect of the disclosure, during encoding of patch temporal alignment for texture mapping compression, re-map transform parameters are calculated for each patch in a texture mapping image (e.g., a texture map, an attribute map). In some examples, the re-map transform parameters for a patch include a rotation angle, a reflection flag, and a spatial translation. The spatial translation is a vector and includes a first value for U coordinate and second value for V coordinate in UV coordinates, respectively. In some examples, the re-map transform parameters for a patch include a rotation angle and a spatial translation. The sign of the rotation angle can indicate whether a reflection operation is applied on the patch.

Figure 12:
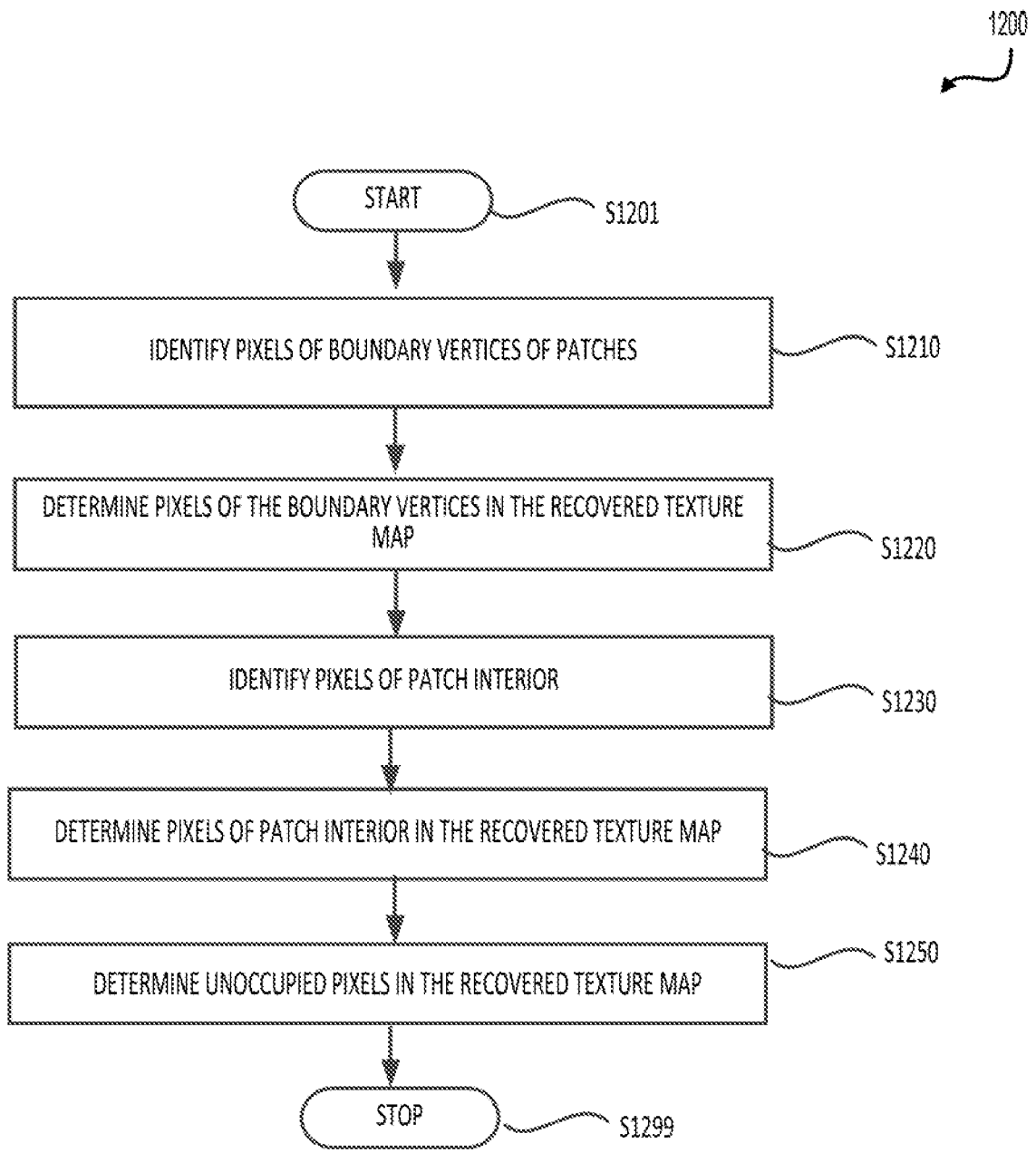
FIG. 12 shows a flow chart outlining a process example in some examples.

FIG. 12 shows a flow chart outlining a process (1200) in some embodiments. The process (1200) can be used during a decoding process for a mesh frame. The process (1200) can receive a bitstream that includes encoded original geometry information of the mesh frame (e.g., original UV coordinates of vertices without temporal alignment), and an encoded temporally aligned texture map with patch temporal alignment to another mesh frame (such as a decoded mesh frame of a past time instance). It is noted that the temporally aligned texture map is generated (re-mapped) by applying transform operations (e.g., rotation operation, reflection operation, spatial translation operation and the like) on patches of the mesh frame according to remap transform parameters associated with the patches at the encoder side. The remap transform parameters are also encoded into the bitstream. At the decoder side, the decoder can decode the remap transform parameters associated with patches and a texture map (e.g., decoded temporally aligned texture map) from the bitstream. Then, the process (1200) can generate a recovered texture map corresponding to the original geometry information. In some examples, the process (1200) can restore the pixels of boundary vertices of patches in the recovered texture map, then restore pixels of patch interior for the patches in the recovered texture map, and finally restore unoccupied pixels in the recovered texture map. In various embodiments, the process (1200) is executed by processing circuitry. In some embodiments, the process (1200) is implemented in software instructions, thus when the processing circuitry executes the software instructions, the processing circuitry performs the process (1200). The process starts at (S1201) and proceeds to (S1210).

At (S1210), pixels of boundary vertices of patches are identified. In some examples, geometry information (e.g., original UV coordinates, connections) of boundary vertices of a patch are encoded before other vertices of the patch, and the number of boundary vertices of the patch is encoded into the bitstream. In an example, from the bitstream, the decoder can decode the UV coordinates of the boundary vertices of each patch.

At (S1220), pixel values of the boundary vertices in the recovered texture map are determined.

For example, for a pixel p in the recovered texture map, when the pixel p is a boundary vertex of a patch (e.g., UV coordinates of the pixel p in the recovered texture map are in the decoded UV coordinates of boundary vertices of the patch), the value of the pixel p in the recovered texture map can be determined according to the re-map transform parameters of the patch and the temporally aligned texture map (also referred to as decoded texture map in some examples) decoded from the bitstream.

In an embodiment, the re-map transform parameters of the patch include a rotation angle, a reflection flag, and a spatial translation vector that includes two values that are U component and V component of the spatial translation operation in UV coordinates.

Figure 13:
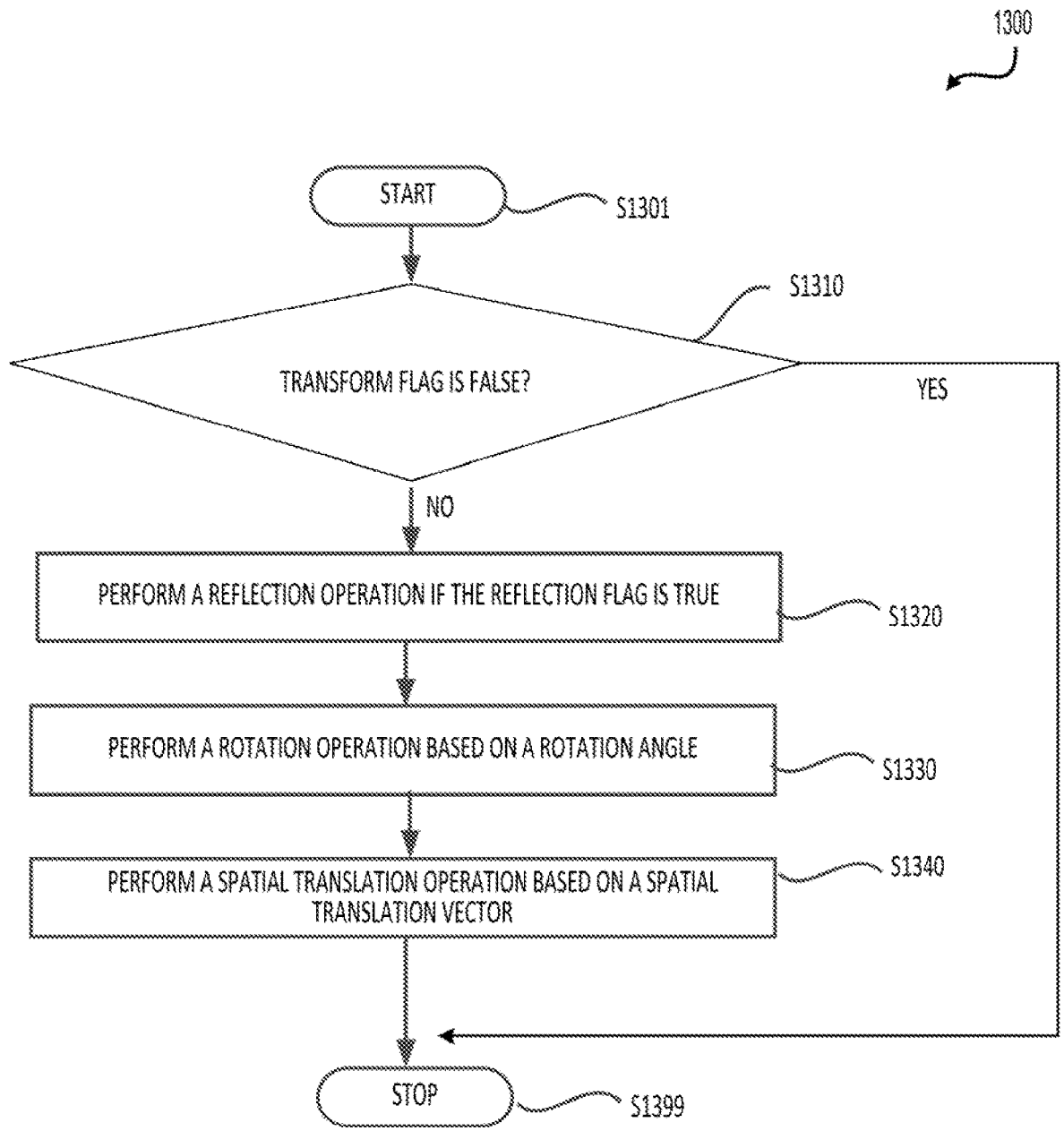
FIG. 13 shows a flow chart outlining a process example in some examples.

FIG. 13 shows a flow chart outlining a process (1300) to determine, for a pixel in the recovered texture map, a position of a corresponding transformed pixel in the decoded texture map. In an example, the pixel p is a boundary vertex of a patch $P_{i,t}$, and the re-map transform parameters of the patch $P_{i,t}$ include a rotation angle r, a reflection flag, and a spatial translation vector (u, v), then a position of a corresponding transformed pixel (e.g., corresponding transformed UV coordinates) of in the decoded texture map can be determined by the process (1300). The process (1300) starts at (S1301) and proceeds to S(1310).

At (S1310), a transform flag of the patch $P_{i,t}$ is determined. When the transform flag is false, the re-map transform is trivial, the corresponding transformed UV coordinates in the decoded texture map are the same as the pixel p in the recovered texture map, and the process (1300) proceeds to (S1399) and terminates. When the transform flag is true, the process (1300) proceeds to (S1320).

At (S1320), a reflection operation is performed based on a reflected flag. In an example, the reflection flag is decoded from the bitstream. When the reflection flag is true, a reflection operation has been applied on the patch $P_{i,t}$ at the encoder side. At the decoder side, a reflection operation, such as reflection along the horizontal axis, and the like is applied to the position of the pixel p in the patch $P_{i,t}$ in a similar manner as the encoder side to update the position of the pixel p. When the reflection flag is false, no reflection operation is applied to the patch $P_{i,t}$ at the encoder side, and at the decoder side, no reflection operation is applied on the pixel p.

At (S1330), a rotation angle r is reconstructed after decoding and de-quantization. Then, a rotation operation by the rotation angle r is applied to the position of the pixel p (or the updated position of the pixel p in the case the reflection flag being true), the position of the pixel after rotation operation is referred to as rotated pixel position.

At (S1340), the spatial translation vector (u, v) is reconstructed after decoding and de-quantization. The spatial translation vector (u, v) is then applied to the rotated pixel position to determine the spatially translated pixel position. The spatially translated pixel position is a transformed position in the decoded texture map for the pixel p in the recovered texture map, and the transformed position is specified by transformed UV coordinates in the decoded texture map. Then, the process (1300) proceeds to (S1399) and terminates.

In another embodiment, the re-map transform parameters include a rotation angle and a spatial translation vector that includes two values that are U component and V component of a spatial translation operation in UV coordinates.

Figure 14:
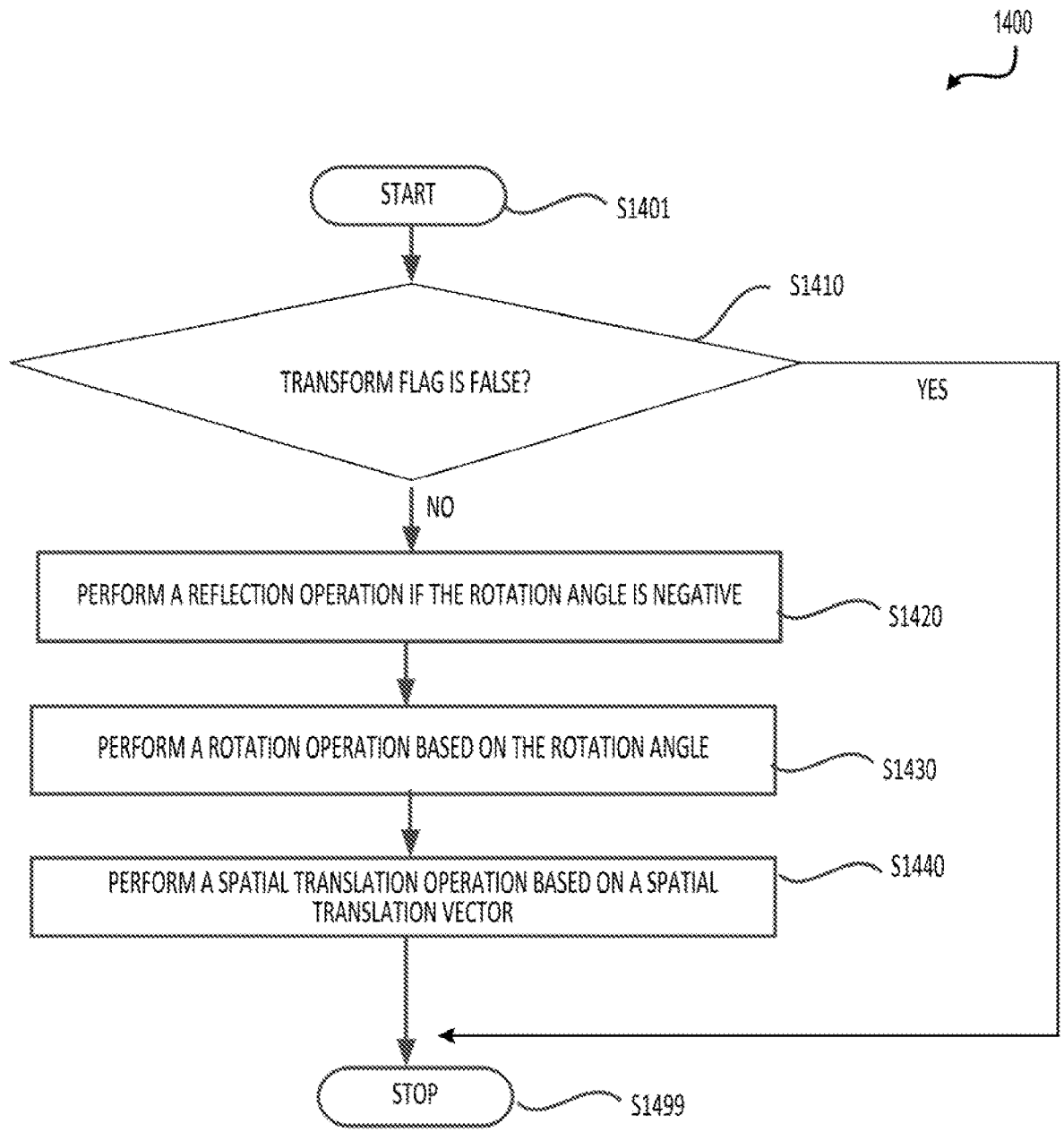
FIG. 14 shows a flow chart outlining a process example in some examples.

FIG. 14 shows a flow chart outlining a process (1400) to determine, for a pixel in the recovered texture map, a position of a corresponding transformed pixel in the decoded texture map. In an example, the pixel p is a boundary vertex of a patch $P_{i,t}$, and the re-map transform parameters of the patch $P_{i,t}$ include a rotation angle r and a spatial translation vector (u, v), then a position of a corresponding transformed pixel (e.g., corresponding transformed UV coordinates) in the decoded texture map can be determined by the process (1400). The process (1400) starts at (S1401) and proceeds to S(1410).

At (S1410), a transform flag of the patch $P_{i,t}$ is determined. When the transform flag is false, the re-map transform is trivial, the corresponding transformed UV coordinates in the decoded texture map are the same as the pixel p in the recovered texture map, and the process (1400) proceeds to (S1499) and terminates. When the transform flag is true, the process (1400) proceeds to (S1420).

At (S1420), a rotation angle r is reconstructed after decoding and de-quantization. When the rotation angle r is negative, a reflection operation has been applied on the patch $P_{i,t}$ at the encoder side. At the decoder side, a reflection operation, such as reflection along the horizontal axis, and the like is applied to the position of the pixel p in the patch $P_{i,t}$ in a similar manner as the encoder side to update the position of the pixel p.

At (S1430), a rotation operation according to the absolute value of the rotation angle r is applied to the position of the pixel p (or the updated position of the pixel p in the case the rotation angle being negative), the position of the pixel after rotation operation is referred to as rotated pixel position.

At (S1440), the spatial translation vector (u, v) is reconstructed after decoding and de-quantization. The spatial translation vector (u, v) is then applied to the rotated pixel position to determine the spatially translated pixel position. The spatially translated pixel position is a transformed position in the decoded texture map for the pixel p in the recovered texture map, and the transformed position is specified by transformed UV coordinates in the decoded texture map. Then the process (1400) proceeds to (S1499), and terminates.

After the transformed UV coordinates of the transformed pixel in the decoded texture map are determined, the pixel p in the recovered texture map can be assigned with a texture value at the transformed position in the decoded texture map. In some examples, when one or more coordinates of the transformed UV coordinates in the decoded texture map are not integer valued, interpolation can be used to derive the texture value at the transformed position in the decoded texture map. The interpolation can use any suitable interpolation technique, such as nearest-neighbor, bilinear, bicubic, Sinc, Lanczos, box sampling, mipmap, Fourier-transform based, edge-directed, high quality scale (hqx), vectorization, deep convolutional neural network based, and the like.

Referring back to FIG. 12, at (S1230), pixels of patch interior are identified. For a pixel p that is not a patch boundary vertex in the recovered texture map, the pixel p can be identified as patch interior or unoccupied, for example according to boundary edges formed by boundary vertices. When the pixel p is inside a patch or on the boundary of a patch, the pixel p is a pixel of patch interior.

At (S1240), texture values for pixels of patch interior in the recovered texture map are determined.

In some examples, the pixel p is inside a patch $P_{i,t}$ or on the boundary of a patch $P_{i,t}$, the process (1300) or the process (1400) can be performed to derive a corresponding transformed position in the decoded texture map, and the texture value of the corresponding transformed position in the decoded texture map can be assigned to the pixel p in the recovered map. In some examples, when one or more coordinates of the corresponding transformed position (the transformed UV coordinates) in the decoded texture map are not integer valued, interpolation can be used to derive the texture value at the corresponding transformed position in the decoded texture map. The interpolation can use any suitable interpolation technique, such as nearest-neighbor, bilinear, bicubic, Sinc, Lanczos, box sampling, mipmap, Fourier-transform based, edge-directed, high quality scale (hqx), vectorization, deep convolutional neural network based, and the like.

At (S1250), unoccupied pixels in the recovered texture map are determined. For a pixel that is not inside a patch nor on the boundary of a patch, the pixel is an unoccupied pixel. For an unoccupied pixel, the texture value can be assigned with arbitrary values. In some examples, to improve 3D mesh rendering quality, the texture value of an unoccupied pixel can be derived from values of occupied spatial/temporal neighboring pixels.

In an embodiment, unoccupied pixels can be assigned with a constant value, and the constant value can be a mean value or median value of texture values or attribute values of all occupied pixels.

In some examples, boundary expansion techniques that expand the boundary values of patches to fill unoccupied pixels are used. In some examples, a mipmap technique is used to fill unoccupied pixels.

According to an aspect of the disclosure, a boundary expansion technique can expand texture values of boundary pixels to neighboring unoccupied pixels. In an example, a boundary pixel is defined as a pixel whose texture values is assigned but (at least) one of neighboring pixels has not been assigned with a texture value (or has unassigned texture value).

In some examples, neighborhoods (neighboring pixels) of patch boundary vertices, pixels inside a patch or on the boundary of a patch in the recovered texture map are checked to form a boundary pixel list. In an example, a neighborhood of a pixel is defined by an N×N box centered at the pixel, N is positive integer. In an example, N is equal to 3, a 3×3 neighborhood of a pixel gives 8 neighbors that referred to as top-left, top-middle, top-right, middle-left, middle-right, bottom-left, bottom-middle, and bottom-right, respectively. If a pixel has at least one neighbor that has unassigned texture values, then this pixel is a boundary pixel, and the pixel can be added to the boundary pixel list.

In some examples, one or more iterations of boundary expansion can be performed to fill the unoccupied pixels in a recovered texture map. For a first iteration of boundary expansion, boundary pixels in the recovered texture map are determined from patch boundary vertices, pixels inside a patch or on the boundary of a patch, and the boundary pixels can be added into a boundary pixel list. For each boundary pixel, neighbors of the boundary pixel with no texture values are referred to as unassigned neighbors. For an unassigned neighbor (also referred to as unassigned pixel), the texture value can be determined by averaging texture values of assigned neighbors in an assigned neighborhood of the unassigned neighbor. The assigned neighborhood of the unassigned neighbor can be defined by a M×M box centered as the unassigned pixel, M is a position integer. In some examples, M has the same positive integer value as N. In some examples, M has a different positive integer value as N.

After assigning texture values to unassigned neighbor(s) of a boundary pixel, the boundary pixel is removed from the boundary pixel list, as all neighbors of the boundary pixel have been assigned with texture values.

In some examples, after all boundary pixels in the boundary pixel list are removed in the first iteration, if there still exist pixels without being assigned with texture values (also referred to as unassigned pixels, such as unoccupied pixels with unsigned texture map values) in the recovered texture map, the pixels can be assigned with a constant value. The constant value can be a mean value or median value of texture values of all assigned pixels. In some examples, a mipmap technique is used to fill unassigned pixels.

In some embodiment, a second iteration of boundary expansion can be performed to assign texture values to unassigned pixels. For example, after the first iteration, a new boundary pixel list can be formed from the newly assigned pixels who has at least one unassigned neighbor. For a boundary pixel in the new boundary pixel list, the texture value of each unassigned neighbor can be determined by averaging texture values of assigned neighbors in an assigned neighborhood of the unassigned neighbor. After the neighbors of the boundary pixel are all assigned with texture values, the boundary pixel is removed from the new boundary pixel list. The second iteration continues until the new boundary pixel list is empty.

It is noted that more iteration of boundary expansion can be performed if the recovered texture map has unassigned pixels. After each iteration of boundary expansion, the number of pixels whose texture values are unassigned is reduced. Eventually the iteration will stop as all pixels have been assigned with texture values.

Figure 15:
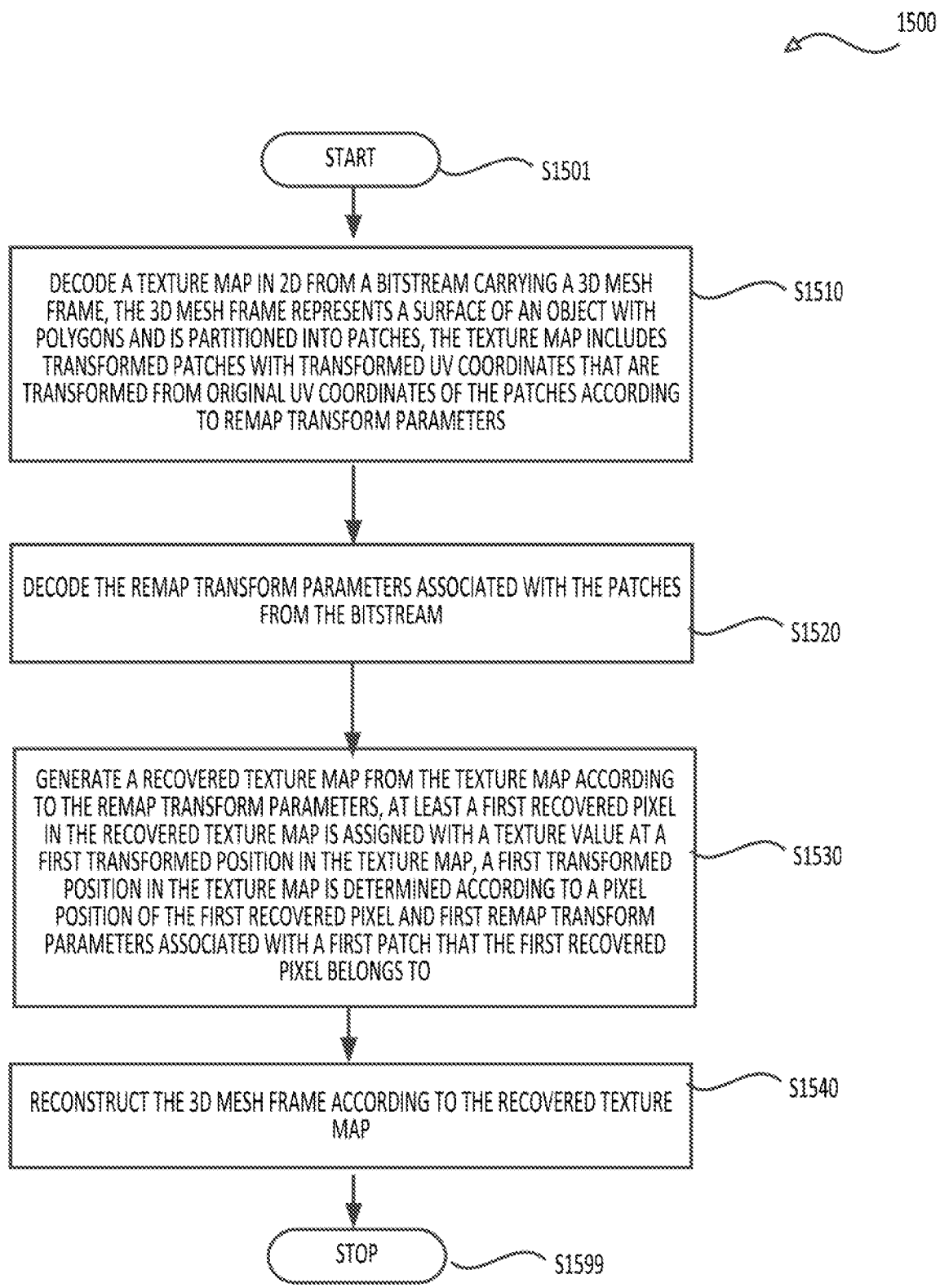
FIG. 15 shows a flow chart outlining a process example in some examples.

FIG. 15 shows a flow chart outlining a process (1500) according to an embodiment of the disclosure. The process (1500) can be used during a decoding process for a mesh sequence of mesh frames. In various embodiments, the process (1500) is executed by processing circuitry. In some embodiments, the process (1500) is implemented in software instructions, thus when the processing circuitry executes the software instructions, the processing circuitry performs the process (1500). The process starts at (S1501) and proceeds to (S1510).

At (S1510), a texture map in 2D is decoded from a bitstream carrying a 3D mesh frame. The 3D mesh frame represents a surface of an object with polygons and is partitioned into patches. The texture map includes transformed patches with transformed UV coordinates that are transformed from original UV coordinates of the patches according to remap transform parameters associated with the patches. The remap transform parameters indicate transformation operations that have been performed to generate the transformed patches.

At (S1520), the remap transform parameters associated with the patches are decoded from the bitstream.

At (S1530), a recovered texture map is generated from the texture map according to the remap transform parameters. At least a first recovered pixel in the recovered texture map is assigned with a texture value at a first transformed position in the texture map. The first transformed position in the texture map is determined according to a pixel position of the first recovered pixel and first remap transform parameters associated with a first patch that the first recovered pixel belongs to.

At (S1540), the 3D mesh frame is reconstructed according to the recovered texture map.

To generate the recovered texture map, in an embodiment, the first recovered pixel is determined to belong to the first patch according to an index map that maps the pixel position of the first recovered pixel to a first patch index indicating the first patch.

In some embodiments, to generate the recovered texture map, first pixel positions corresponding to boundary vertices of the first patch are identified. Then, first transformed positions in the texture map respectively corresponding to the first pixel positions are determined by applying the first remap transform parameters on the first pixel positions. Further, first texture values at the first transformed positions of the texture map are assigned to the corresponding first pixel positions in the recovered texture map.

Further, in some examples, second pixel positions that are patch interior of the first patch are identified according to the first pixel positions. Then, second transformed positions in the texture map corresponding to the second pixel positions are determined by applying the first remap transform parameters on the second pixel positions. Second texture values at the second transformed positions of the texture map are assigned to the corresponding second pixel positions in the recovered texture map.

In some examples, the texture value at the first transformed position in the texture map is determined by an interpolation in response to one or more coordinates of the first transformed position not being integer.

In some examples, the first remap transform parameters include a rotation angle for a rotation operation, a spatial translation vector for a spatial translation operation, and a reflection flag indicative of whether a reflection operation is performed.

In some examples, the first remap transform parameters include a rotation angle and a spatial translation vector. A sign of the rotation angle indicates whether a reflection operation is performed. The absolute value of the rotation angle is for a rotation operation, and the spatial translation vector is for a spatial translation operation.

In some examples, to generating the recovered texture map, a value is assigned to an unoccupied pixel in the recovered texture map according to one or more occupied pixels in an occupied area in the recovered texture map. The occupied area includes occupied pixels belonging to the patches, the unoccupied pixel is outside of the occupied area. In some examples, the value is calculated as at least one of a mean value and/or a median value of the occupied pixels in the occupied area.

In some examples, a boundary pixel is determined in the recovered texture map. The boundary pixel is an occupied pixel having at least an unassigned neighboring pixel in a first neighborhood of the boundary pixel. The unassigned neighboring pixel has an unassigned texture value (e.g., not assigned with a texture value). Assigned neighboring pixels in a second neighborhood of the unassigned neighboring pixel are determined, and a derived texture value to assign to the unassigned neighboring pixel is determined based on the assigned neighboring pixels in the second neighborhood.

Then, the process proceeds to (S1599) and terminates.

The process (1500) can be suitably adapted. Step(s) in the process (1500) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
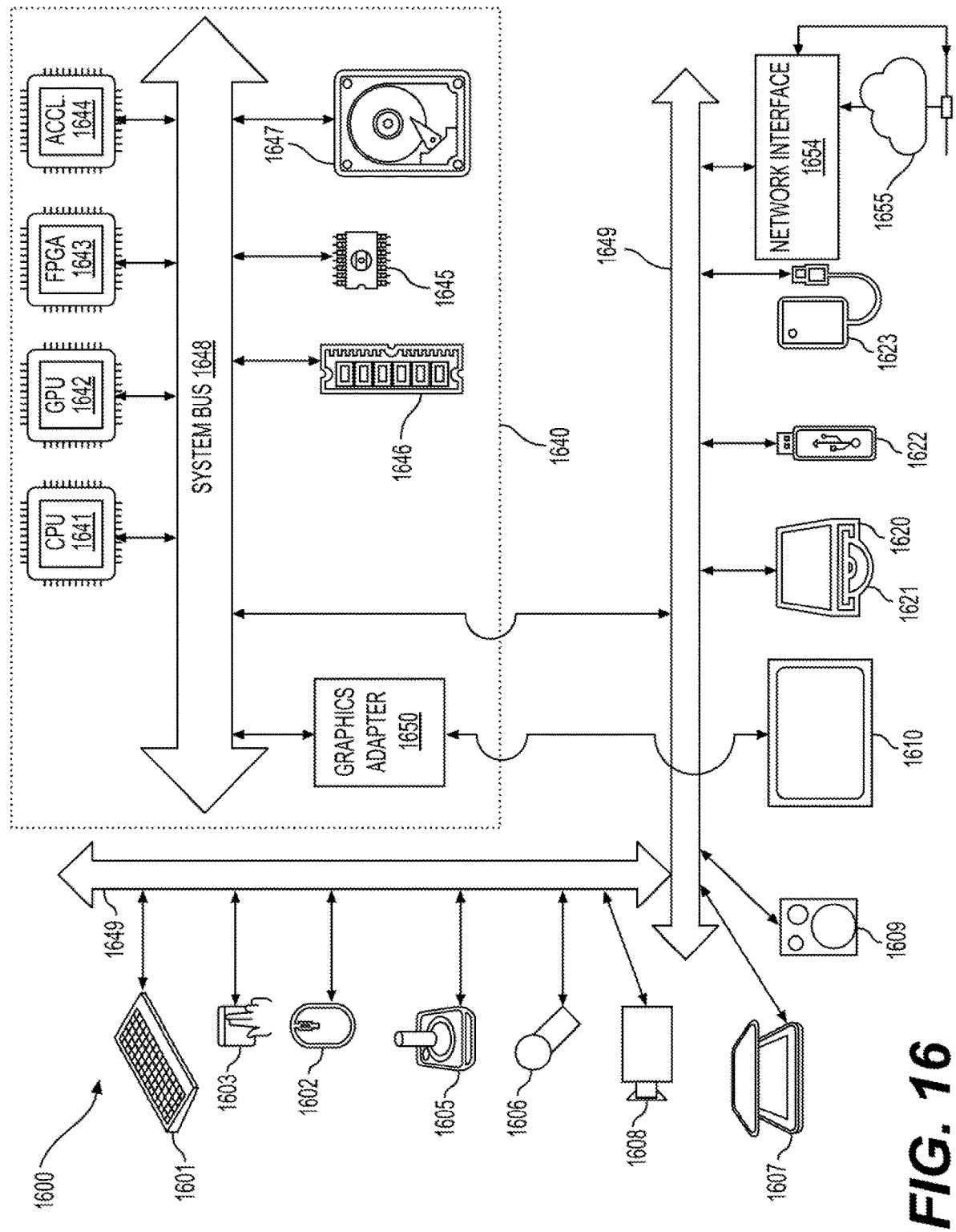
FIG. 16 is a schematic illustration of a computer system in some examples.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh decompression, comprising;
decoding a texture map in two dimension (2D) from a bitstream carrying a three dimensional (3D) mesh frame, the 3D mesh frame representing a surface of an object with polygons and been partitioned into patches, the texture map comprising transformed patches with transformed UV coordinates that are transformed from original UV coordinates of the patches according to remap transform parameters, the remap transform parameters indicating transformation operations that have been performed to generate the transformed patches;
decoding the remap transform parameters associated with the patches from the bitstream;
generating a recovered texture map from the texture map according to the remap transform parameters, at least a first recovered pixel in the recovered texture map being assigned with a texture value at a first transformed position in the texture map, the first transformed position in the texture map being determined according to a pixel position of the first recovered pixel and first remap transform parameters associated with a first patch that the first recovered pixel belongs to; and
reconstructing the 3D mesh frame according to the recovered texture map.

2. The method of claim 1, wherein the generating the recovered texture map further comprises:
determining that the first recovered pixel belongs to the first patch according to an index map that maps the pixel position of the first recovered pixel to a first patch index indicating the first patch.

3. The method of claim 1, wherein the generating the recovered texture map further comprises:
identifying first pixel positions corresponding to boundary vertices of the first patch;
determining first transformed positions in the texture map respectively corresponding to the first pixel positions by applying the first remap transform parameters on the first pixel positions; and
assigning first texture values at the first transformed positions of the texture map to the corresponding first pixel positions in the recovered texture map.

4. The method of claim 3, further comprising:
identifying second pixel positions that are patch interior of the first patch according to the first pixel positions;
determining second transformed positions in the texture map corresponding to the second pixel positions by applying the first remap transform parameters on the second pixel positions; and
assigning second texture values at the second transformed positions of the texture map to the corresponding second pixel positions in the recovered texture map.

5. The method of claim 1, further comprising:
determining the texture value at the first transformed position in the texture map by an interpolation in response to one or more coordinates of the first transformed position not being integer.

6. The method of claim 1, wherein the first remap transform parameters comprise a rotation angle, a spatial translation vector, and a reflection flag indicative of a reflection operation.

7. The method of claim 1, wherein the first remap transform parameters comprise a rotation angle and a spatial translation vector, and a sign of the rotation angle indicates a reflection operation.

8. The method of claim 1, wherein the generating the recovered texture map further comprises:
assigning a value to an unoccupied pixel in the recovered texture map according to one or more occupied pixels in an occupied area in the recovered texture map, the occupied area comprising occupied pixels belonging to the patches, the unoccupied pixel being outside of the occupied area.

9. The method of claim 8, wherein the assigning the value to the unoccupied pixel further comprises:
calculating the value as at least one of a mean value and/or a median value of the occupied pixels in the occupied area.

10. The method of claim 8, wherein the assigning the value to the unoccupied pixel further comprises:
determining a boundary pixel in the recovered texture map, the boundary pixel being an occupied pixel having at least an unassigned neighboring pixel in a first neighborhood of the boundary pixel, the unassigned neighboring pixel having an unassigned texture value;
determining assigned neighboring pixels in a second neighborhood of the unassigned neighboring pixel; and
determining a derived texture value to assign to the unassigned neighboring pixel based on the assigned neighboring pixels in the second neighborhood.

11. An apparatus for mesh decompression, comprising processing circuitry configured to;
decode a texture map in two dimension (2D) from a bitstream carrying a three dimensional (3D) mesh frame, the 3D mesh frame representing a surface of an object with polygons and been partitioned into patches, the texture map comprising transformed patches with transformed UV coordinates that are transformed from original UV coordinates of the patches according to remap transform parameters, the remap transform parameters indicating transformation operations that have been performed to generate the transformed patches;
decode the remap transform parameters associated with the patches from the bitstream;
generate a recovered texture map from the texture map according to the remap transform parameters, at least a first recovered pixel in the recovered texture map being assigned with a texture value at a first transformed position in the texture map, the first transformed position in the texture map being determined according to a pixel position of the first recovered pixel and first remap transform parameters associated with a first patch that the first recovered pixel belongs to; and
reconstruct the 3D mesh frame according to the recovered texture map.

12. The apparatus of claim 11, wherein the generating the recovered texture map further comprises:
determining that the first recovered pixel belongs to the first patch according to an index map that maps the pixel position of the first recovered pixel to a first patch index indicating the first patch.

13. The apparatus of claim 11, wherein the generating the recovered texture map further comprises:

identifying first pixel positions corresponding to boundary vertices of the first patch;

determining first transformed positions in the texture map respectively corresponding to the first pixel positions by applying the first remap transform parameters on the first pixel positions; and assigning first texture values at the first transformed positions of the texture map to the corresponding first pixel positions in the recovered texture map.

14. The apparatus of claim 13, further comprising:

identifying second pixel positions that are patch interior of the first patch according to the first pixel positions;

determining second transformed positions in the texture map corresponding to the second pixel positions by applying the first remap transform parameters on the second pixel positions; and assigning second texture values at the second transformed positions of the texture map to the corresponding second pixel positions in the recovered texture map.

15. The apparatus of claim 11, further comprising:

determining the texture value at the first transformed position in the texture map by an interpolation in response to one or more coordinates of the first transformed position not being integer.

16. The apparatus of claim 11, wherein the first remap transform parameters comprise a rotation angle, a spatial translation vector, and a reflection flag indicative of a reflection operation.

17. The apparatus of claim 11, wherein the first remap transform parameters comprise a rotation angle and a spatial translation vector, and a sign of the rotation angle indicates a reflection operation.

18. The apparatus of claim 11, wherein the generating the recovered texture map further comprises:

assigning a value to an unoccupied pixel in the recovered texture map according to one or more occupied pixels in an occupied area in the recovered texture map, the occupied area comprising occupied pixels belonging to the patches, the unoccupied pixel being outside of the occupied area.

19. The apparatus of claim 18, wherein the assigning the value to the unoccupied pixel further comprises:

calculating the value as at least one of a mean value and/or a median value of the occupied pixels in the occupied area.

20. The apparatus of claim 18, wherein the assigning the value to the unoccupied pixel further comprises:

determining a boundary pixel in the recovered texture map, the boundary pixel being an occupied pixel having at least an unassigned neighboring pixel in a first neighborhood of the boundary pixel, the unassigned neighboring pixel having an unassigned texture value;

determining assigned neighboring pixels in a second neighborhood of the unassigned neighboring pixel; and determining a derived texture value to assign to the unassigned neighboring pixel based on the assigned neighboring pixels in the second neighborhood.

* * * * *